(12) United States Patent
Huang et al.

(10) Patent No.: US 9,748,594 B2
(45) Date of Patent: Aug. 29, 2017

(54) POLYMER OF FLUORINE-CONTAINING SULFONATED POLY(ARYLENE ETHER)S AND METHOD OF MANUFACTURING THE SAME

(71) Applicant: National Sun Yat-sen University, Kaohsiung (TW)

(72) Inventors: Wen-yao Huang, Kaohsiung (TW); Hsu-feng Lee, Kaohsiung (TW); Benjamin Britton, Burnaby (CA); Chun-che Lee, Kaohsiung (TW); Steven Holdcroft, Burnaby (CA); Jun-jie Pang, Kaohsiung (TW); Yi-yun Hsu, Kaohsiung (TW); Yu-chao Tseng, Kaohsiung (TW)

(73) Assignee: National Sun Yat-sen University, Kaohsiung (TW)

( * ) Notice: Subject to any disclaimer, the term of this patent is extended or adjusted under 35 U.S.C. 154(b) by 0 days.

(21) Appl. No.: 15/479,299

(22) Filed: Apr. 5, 2017

(65) Prior Publication Data
US 2017/0214075 A1    Jul. 27, 2017

Related U.S. Application Data

(63) Continuation of application No. 14/792,639, filed on Jul. 7, 2015, now Pat. No. 9,644,069.

(51) Int. Cl.
| | | |
|---|---|---|
| *C08G 14/00* | (2006.01) |
| *H01M 8/1067* | (2016.01) |
| *C08G 65/48* | (2006.01) |
| *C08J 5/22* | (2006.01) |
| *B01J 39/19* | (2017.01) |
| *C08G 65/40* | (2006.01) |
| *H01M 8/1025* | (2016.01) |
| *H01M 8/1039* | (2016.01) |
| *H01M 8/1018* | (2016.01) |

(52) U.S. Cl.
CPC .......... *H01M 8/1067* (2013.01); *B01J 39/19* (2017.01); *C08G 65/40* (2013.01); *C08G 65/48* (2013.01); *C08J 5/2262* (2013.01); *H01M 8/1025* (2013.01); *H01M 8/1039* (2013.01); *C08G 2650/02* (2013.01); *C08G 2650/48* (2013.01); *C08J 2371/10* (2013.01); *H01M 2008/1095* (2013.01)

(58) Field of Classification Search
CPC .......... C08G 18/0828; C08G 2261/516; C08G 2261/1452; C08G 2261/722; H01B 1/122; H01M 8/1025
USPC .......... 528/125, 171, 295, 220, 27, 373, 370
See application file for complete search history.

(56) References Cited

PUBLICATIONS

Liu et al. (2013 ROC annual meeting for polymer society, Jan. 25, 2013).*

* cited by examiner

*Primary Examiner* — Shane Fang
(74) *Attorney, Agent, or Firm* — Mark M. Friedman

(57) ABSTRACT

A polymer of fluorine-containing sulfonated poly(arylene ether)s and a manufacturing method thereof are provided. The polymer is formed by processing a nucleophilic polycondensation between a fluorine-containing monomer having an electron-withdrawing group and a multi-phenyl monomer. A main structure of the polymer of fluorine-containing sulfonated poly(arylene ether)s has a first portion with fluoro or trifluoromethyl substituted phenyl groups, and a second portion with sulfonated phenyl groups.

7 Claims, 2 Drawing Sheets

POLYMER OF FLUORINE-CONTAINING SULFONATED POLY(ARYLENE ETHER)S AND METHOD OF MANUFACTURING THE SAME

CROSS REFERENCE TO RELATED APPLICATIONS

This application is a continuation application of U.S. patent application Ser. No. 14/792,639, filed on Jul. 7, 2015, and partly disclosed in a thesis entitled "Fluorine-containing Hydrocarbon Ionic Polymer as Proton Exchange Membrane in PEMFC" on Jul. 7, 2014 completed by Jun-Jie Pang and Wen-Yao Huang, the disclosures of which are incorporated herein by reference.

FIELD OF THE INVENTION

The present invention relates to a polymer of poly(arylene ether)s (PAEs) and a method of manufacturing the PAEs, and in particular relates to a polymer of sulfonated poly(acrylene ether)s having fluorine-containing substituents and a method of manufacturing the polymer.

BACKGROUND OF THE INVENTION

The proton exchange membrane belongs to the solid-state electrolyte. Although it is different from the aqueous electrolyte in the voltaic cell, it also has functions similar to the electrolyte solution which can pass positive and negative ions, as it is a conductor. The main function of the proton exchange membrane is to transmit protons, such polymers in the fuel cell are the most important elements, and directly affect the performance and life of the fuel cell. The requirements of the film are as follows: (a) a good proton transmission capacity (high ion exchange capacity, a uniform microphase separation); (2) able to be isolated from the fuel (gas or methanol) contacts; (3) the catalyst layer in close contact with the film (a good adhesion); and (4) have sufficient mechanical strength and heat tolerance.

The current manufacturing method of the proton exchange membrane can be classified into four types, as shown in FIGS. 1A to 1D, which are schematic diagrams for showing the possible structures of the current sulfonated polymer used in a proton exchange membrane, in which the hatched segments represent the hydrophobic segments, and the unmarked segment represents the hydrophilic segments. The sulfonated polymer shown in FIG. 1A has a linear long chain structure. Although it can be attached with a plurality of sulfonate groups, the sulfonate groups are not enough. The sulfonated polymer shown in FIG. 1B has a branched main chain structure. Although it can be attached with a plurality of sulfonate groups, the proton conductivity thereof is low at high temperatures. The sulfonated polymer shown in FIG. 1C has a linear long chain structure. Although it has more sulfonate groups and higher IEC, the mechanical properties and thermal stability are on the low side. The sulfonated polymer shown in FIG. 1D has a linear main chain structure and has a partially dense distribution of the sulfonic acid groups. Therefore, it has relatively better physical and chemical properties required for a proton exchange membrane.

FIG. 1D shows the locally and densely sulfonated polymer developed in the past two years. This method can gather the sulfonate groups more efficiently to form a locally hydrophilic segment. Therefore, the membrane will have a more concentrated sulfonate hydrophilic end and a longer hydrophobic end within an appropriate IEC value, which has the same conductivity as Nafion and keeps excellent mechanical properties. However, in addition to the conductivity, a good proton exchange membrane must have the advantages of good dimensional stability, thermal stability, high proton transition capability, chemical stability, process stability, and low cost for production. In the aspect of dimensional stability, the proton exchange membrane formed by the abovementioned locally and densely sulfonated polymer still has higher water absorption because the sulfonated positions and the number of sulfonate groups cannot be precisely controlled, and thus the length swelling and the thickness swelling of the proton exchange membrane are also affected.

It is therefore necessary to provide a polymer of fluorine-containing sulfonated poly(arylene ether)s and a method of manufacturing the polymer capable of being used for producing a proton exchange membrane having a better dimensional stability, in order to solve the problems existing in the conventional technology as described above.

SUMMARY OF THE INVENTION

A primary object of the present invention is to provide a polymer of fluorine-containing sulfonated poly(arylene ether)s and a method of manufacturing the polymer, in addition to more phenyl groups for connecting with more sulfonate groups, the polymer of fluorine-containing sulfonated poly(arylene ether)s has electron-withdrawing groups such as trifluoromethyl ($-CF_3$) or fluoro groups ($-F$) to inactivate the phenyl groups to prevent the phenyl groups having the trifluoromethyl or fluoro groups from being attacked by a sulfonation reagent and being connected with the sulfonation reagent during sulfonation reaction, thereby forming a better microphase separation. Moreover, hydrophobic fluorine atoms can avoid the follow-up obtained proton exchange membrane to absorb excess water molecules, and excessive swelling thereof, thus dimensional stability of the proton exchange membrane can be maintained.

To achieve the above object, the present invention provides a polymer of fluorine-containing sulfonated poly(arylene ether)s, having the molecular formula given in the following formula (1):

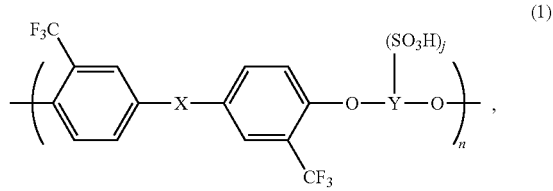

wherein X is
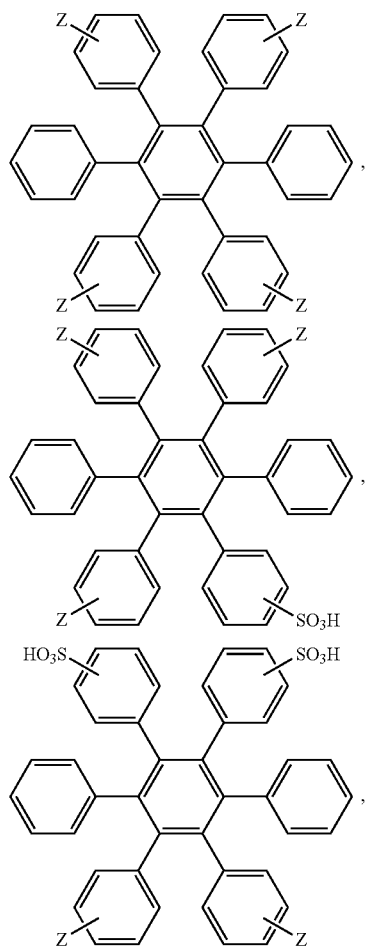
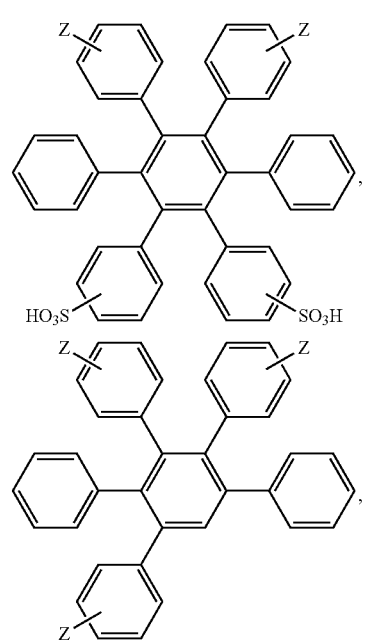
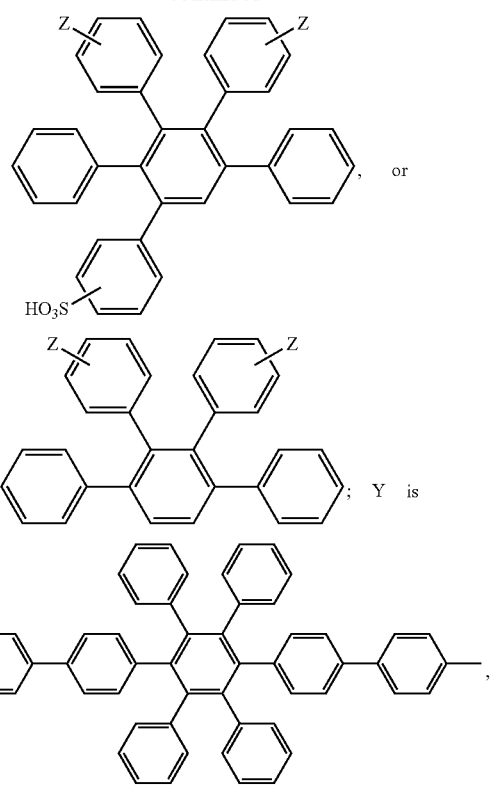
; Y is
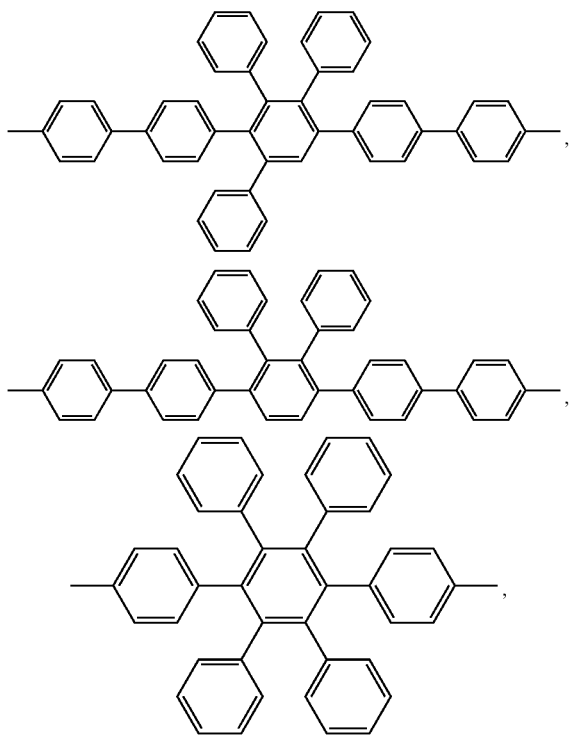

-continued
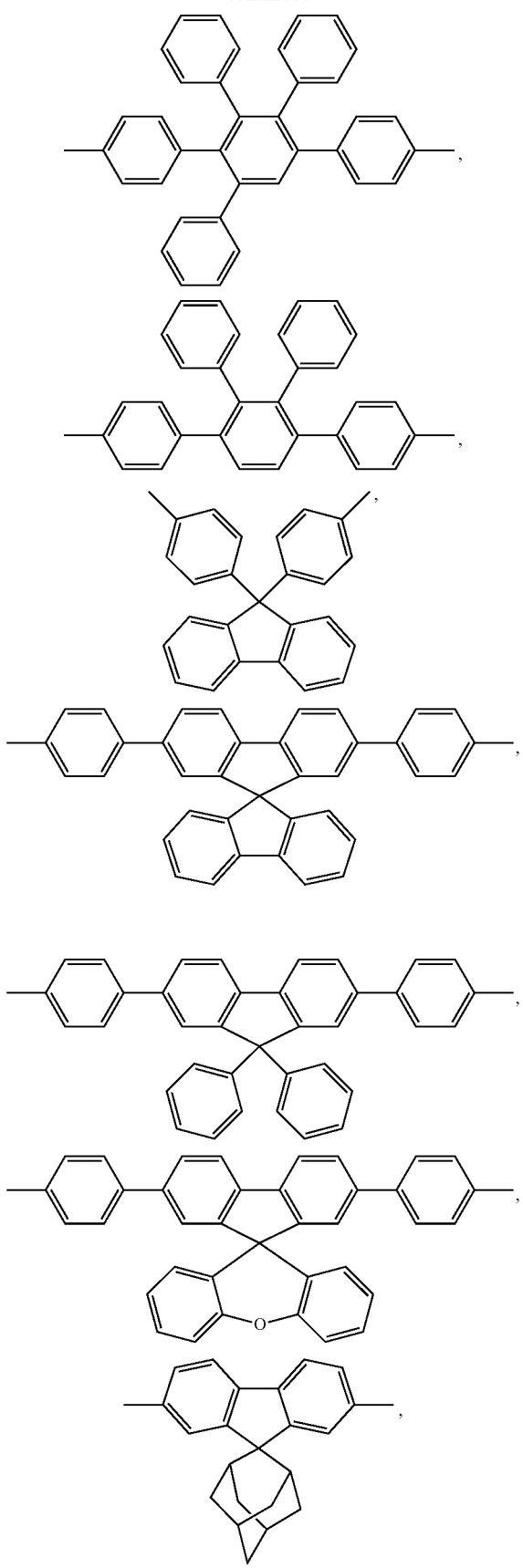
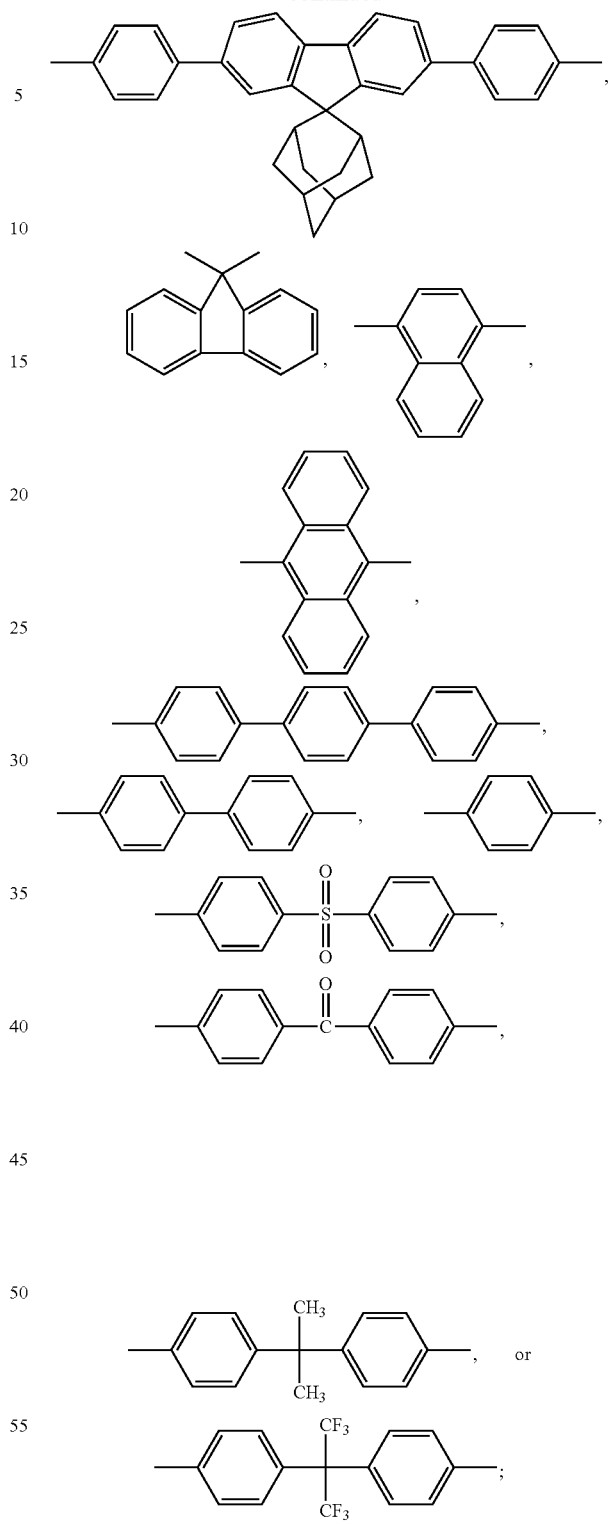
and
wherein Z is independently selected from a fluoro- and trifluoromethyl group; n is an integer equal to or greater than 2; and j is an integer from 1 to 10.
In one embodiment of the present invention, the polymer of fluorine-containing sulfonated poly(arylene ether)s is

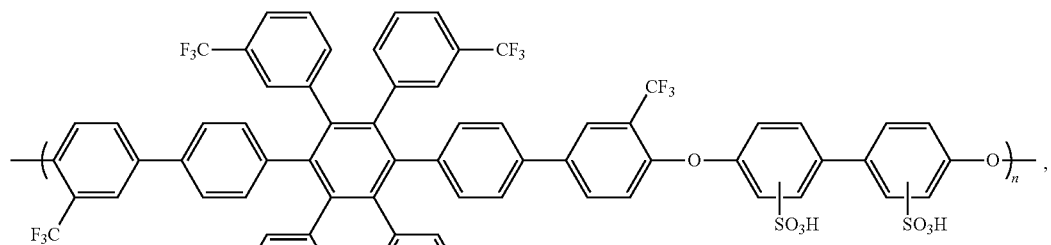

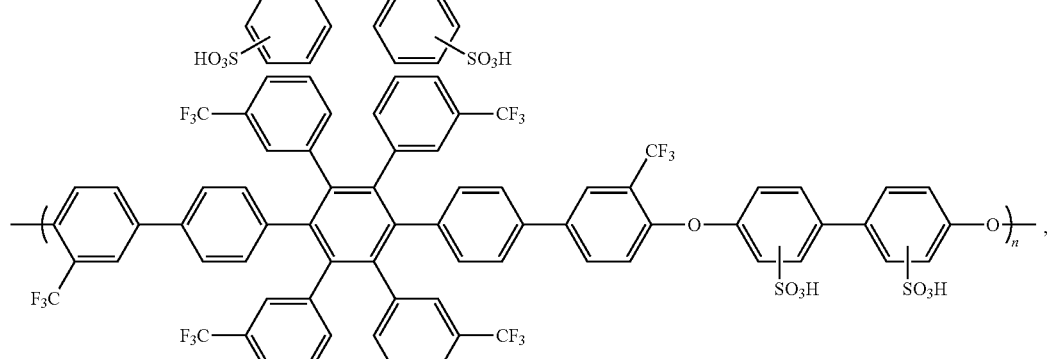

or

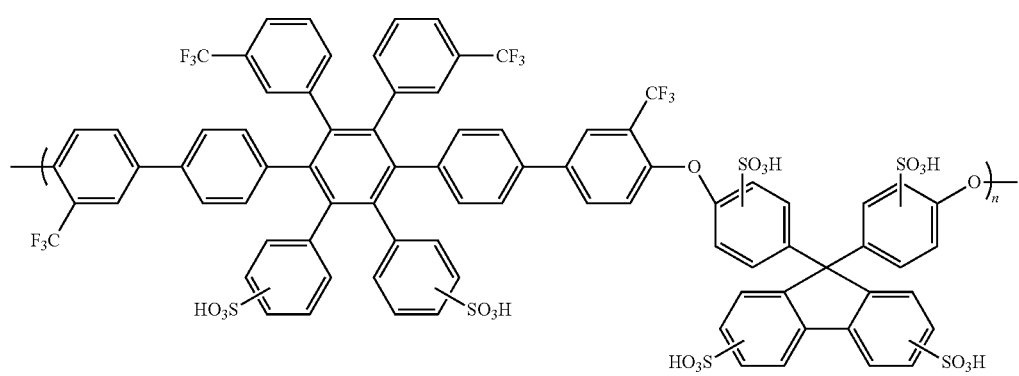

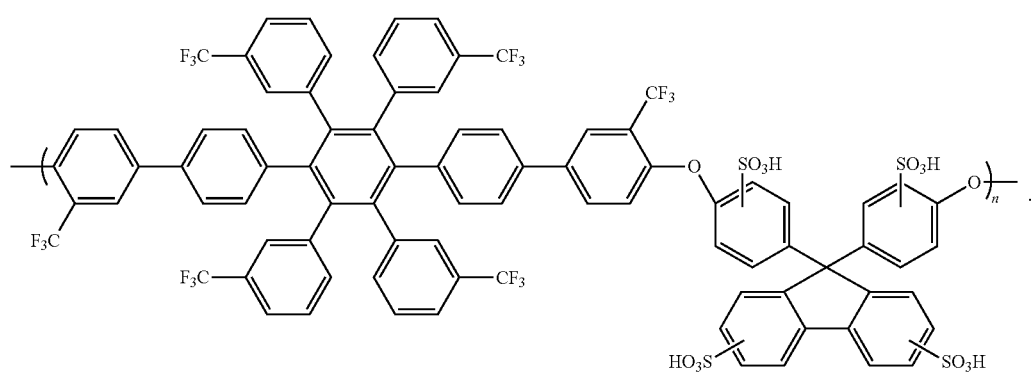

In one embodiment of the present invention, the polymer of fluorine-containing sulfonated poly(arylene ether)s is applied to form a thin film which is used as a proton exchange membrane and applied to a fuel cell system.

Furthermore, the present invention provides a method of manufacturing a polymer of fluorine-containing sulfonated poly(arylene ether)s, comprising steps of:

(S01) providing a fluorine-containing monomer having the structure given in the following formula (I):

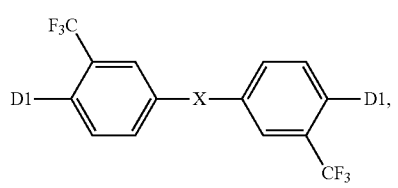

wherein X is
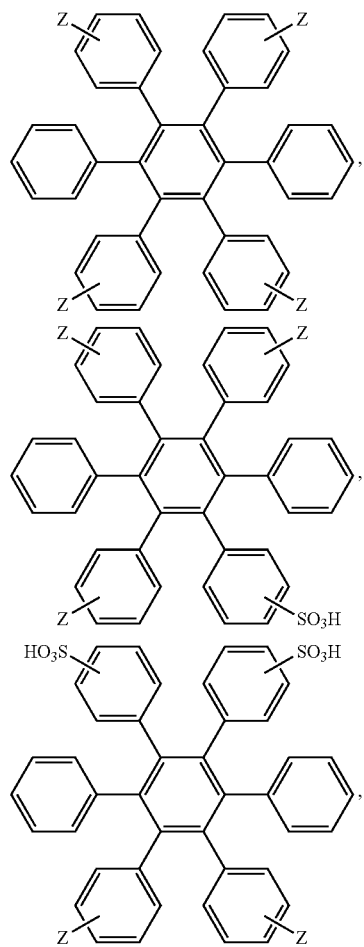
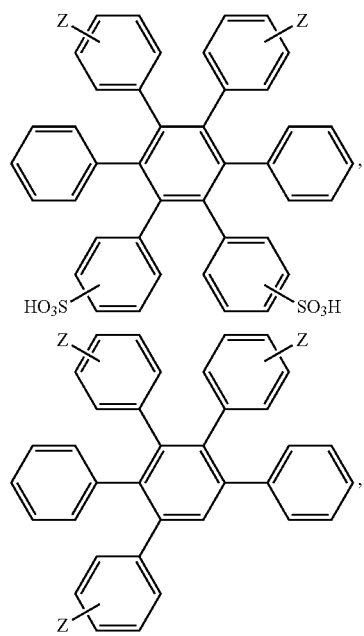
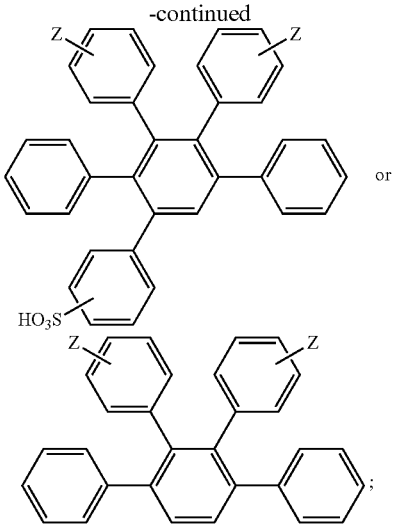 or
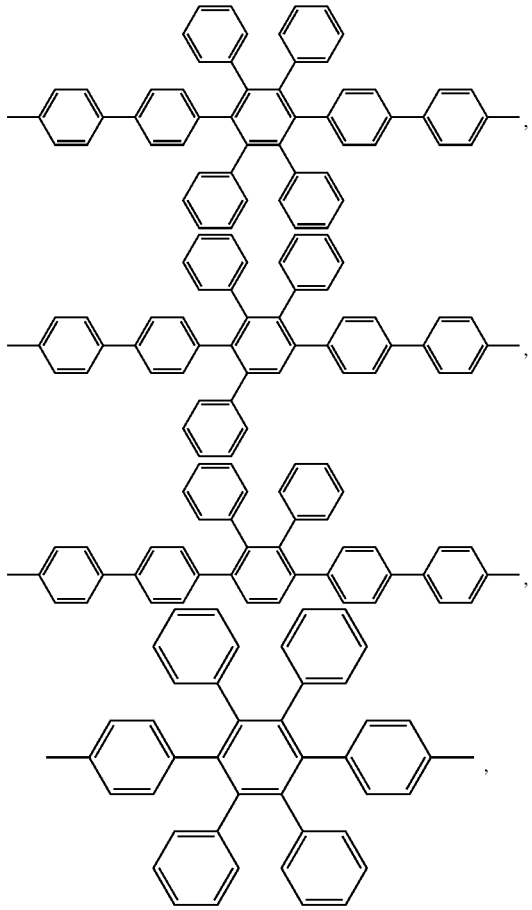
D1 is a halogen or hydroxyl group; and Z is independently selected from a fluoro- or trifluoromethyl group;
(S02) providing a multi-phenyl monomer having the structure given in the following formula (II):
$$D2-Y-D2 \qquad (II),$$
wherein Y is

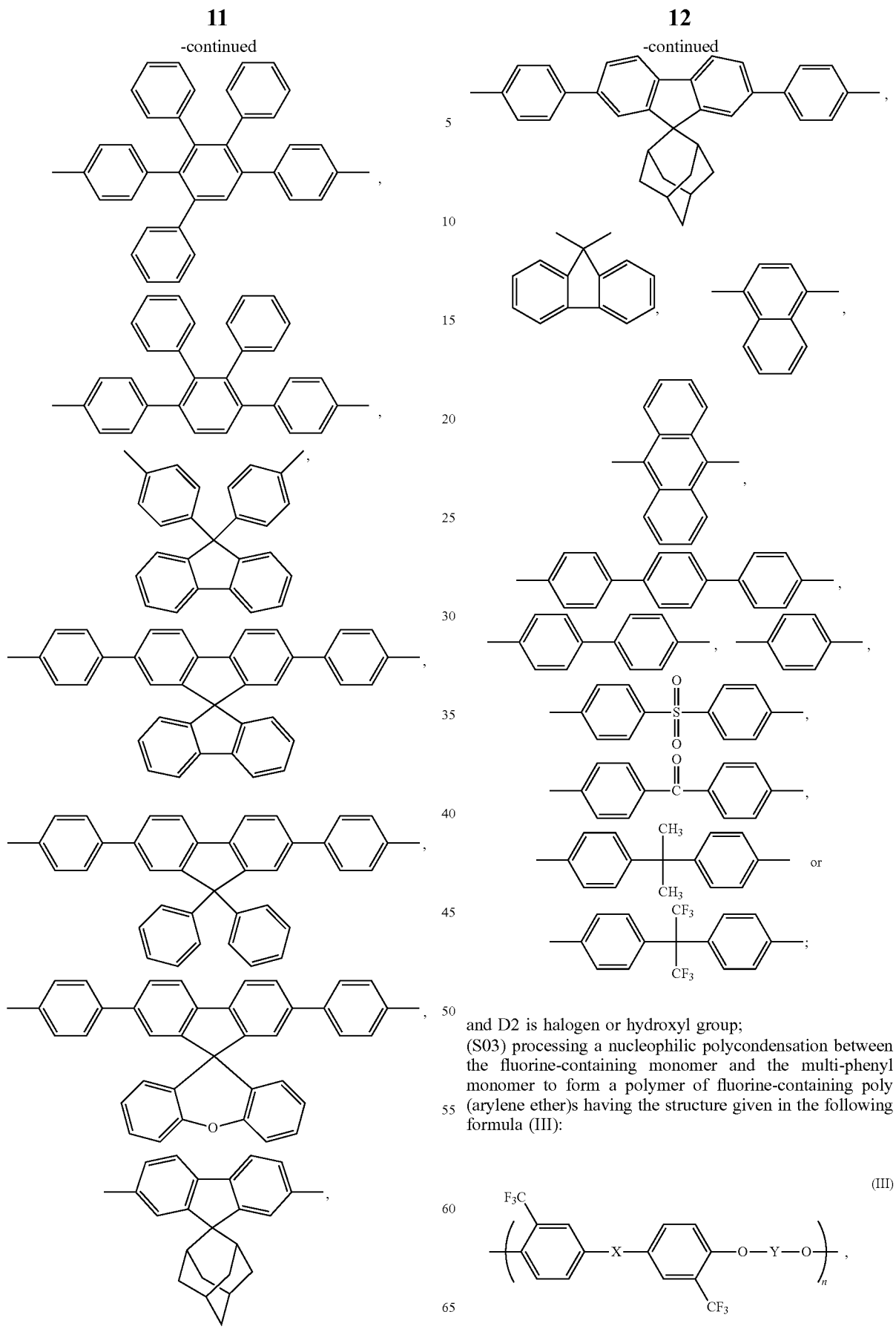
and D2 is halogen or hydroxyl group;
(S03) processing a nucleophilic polycondensation between the fluorine-containing monomer and the multi-phenyl monomer to form a polymer of fluorine-containing poly (arylene ether)s having the structure given in the following formula (III):

wherein n is an integer greater than or equal to 2, and D2 is the hydroxyl group if D1 is the halogen group, or D2 is the halogen group if D1 is the hydroxyl group; and
(S04) carrying out a sulfonation modification of the polymer of fluorine-containing poly(arylene ether)s to form the polymer of fluorine-containing sulfonated poly(arylene ether)s having a molecular formula given in the formula (1).

In one embodiment of the present invention, the fluorine-containing monomer in step (S01) is selected from

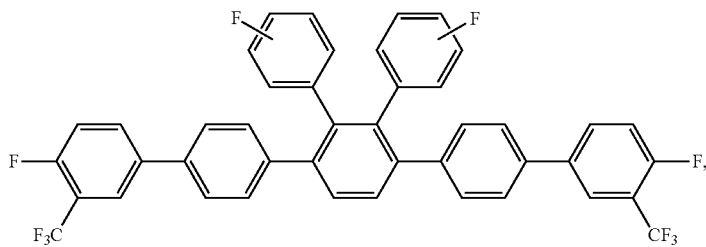

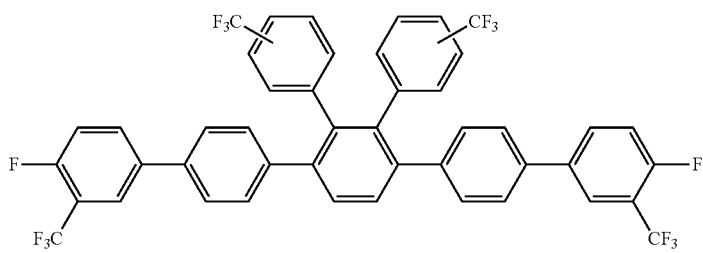

or

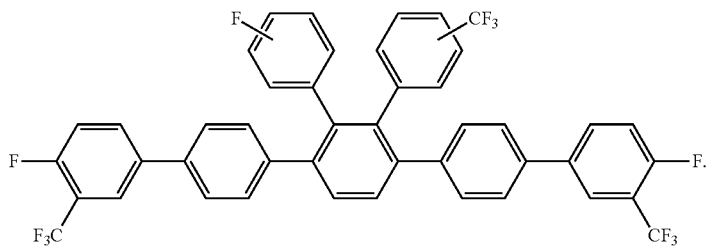

In one embodiment of the present invention, the fluorine-containing monomer in the step (S01) is selected from
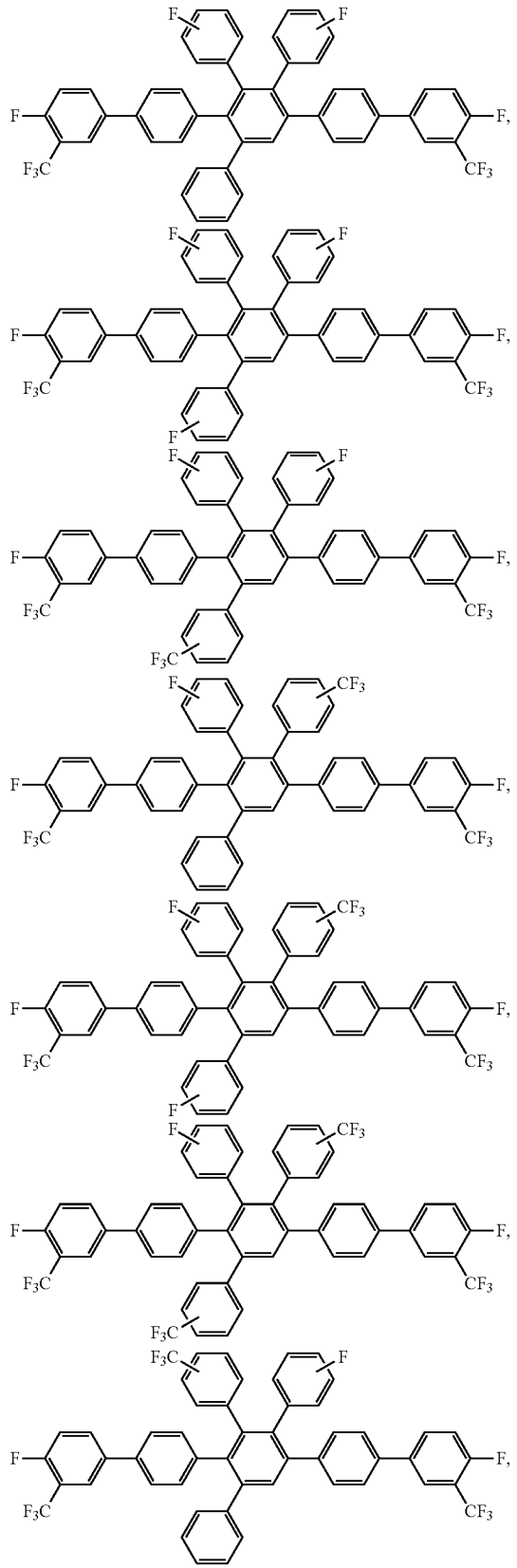
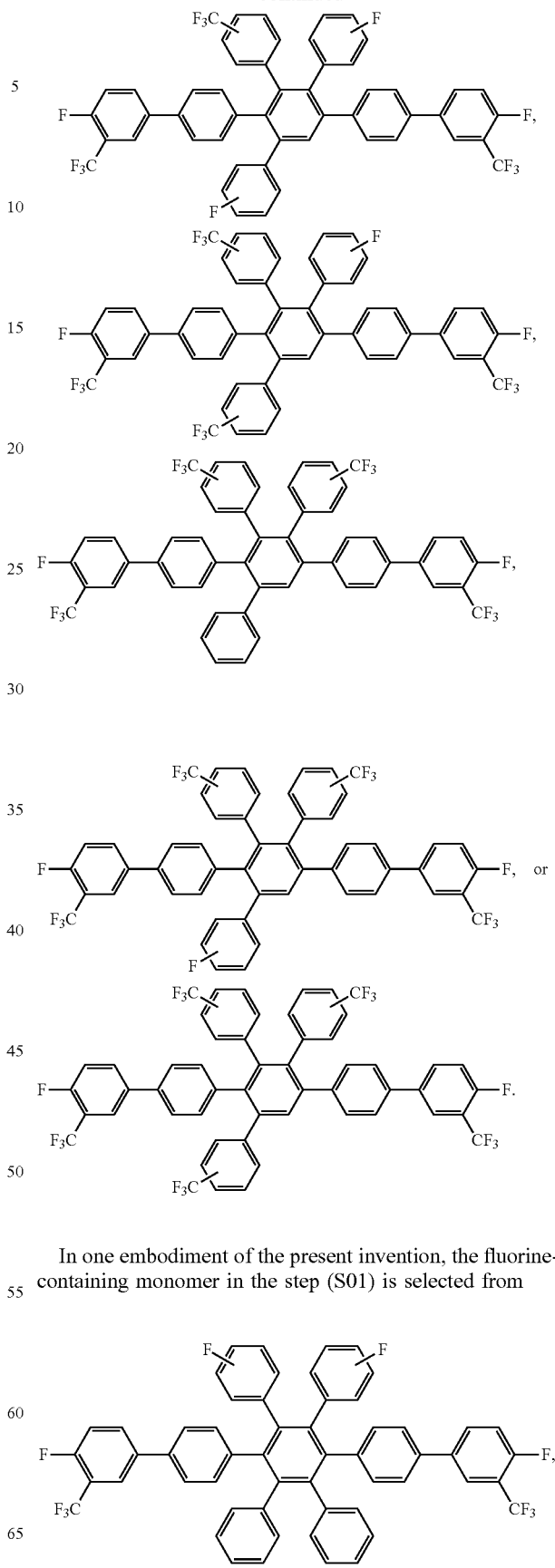
In one embodiment of the present invention, the fluorine-containing monomer in the step (S01) is selected from

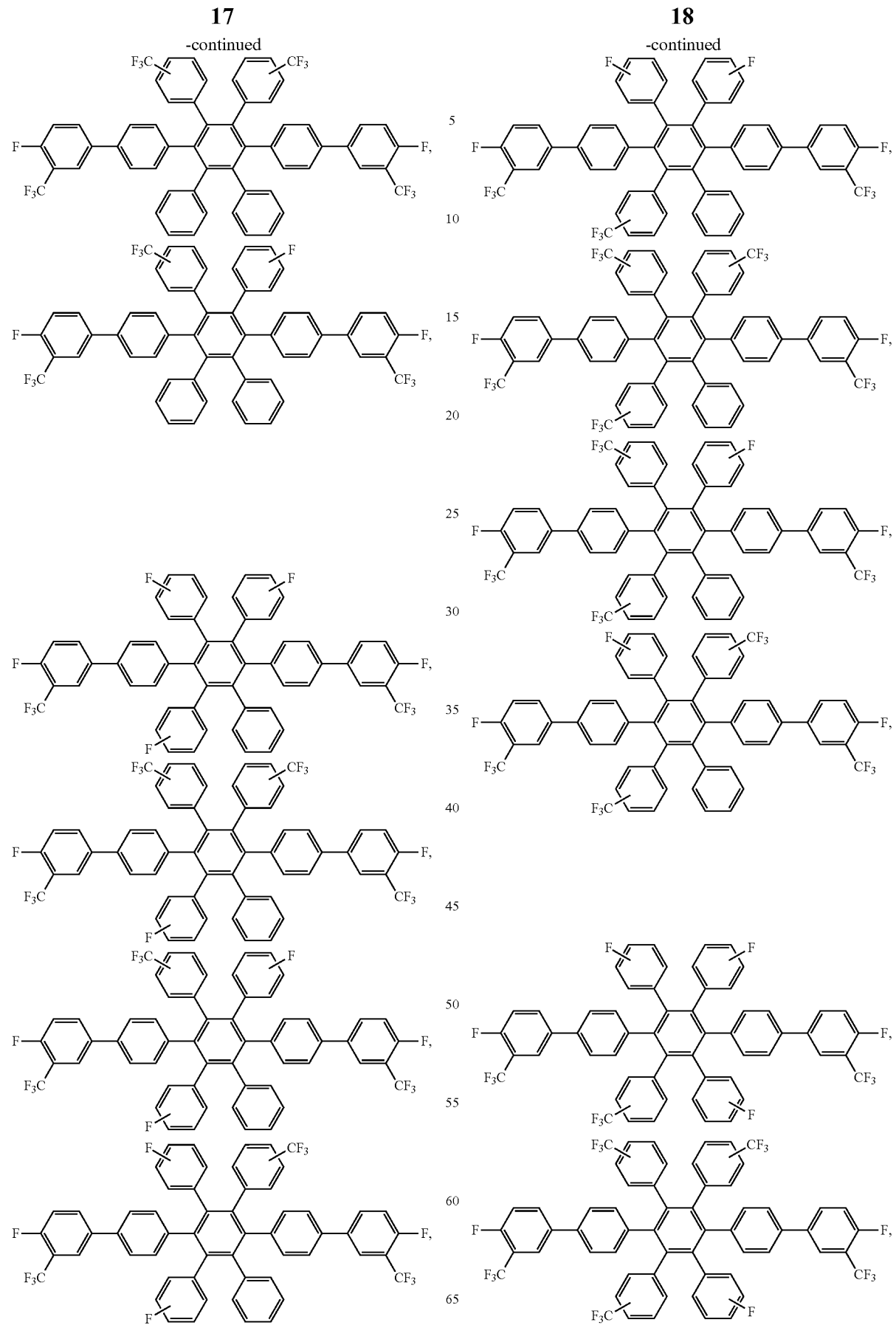

-continued

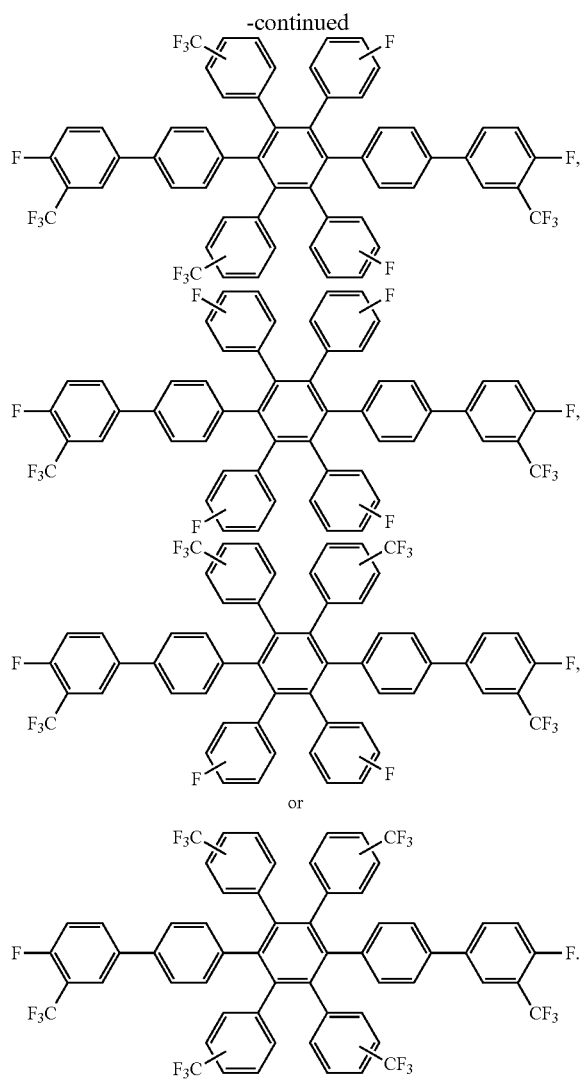

In one embodiment of the present invention, the step (S04) is performed by:

dissolving the polymer of fluorine-containing poly(arylene ether)s in dichloromethane to be a first solution;

adding a mixture formed by lauric acid and chlorosulfonic acid into the first solution under a nitrogen atmosphere, so as to be a second solution which proceeds the sulfonation modification;

adding cyclohexane and ether into the second solution after the sulfonation modification, so as to be a third solution;

separating a reaction product from the third solution, and collecting the reaction product; and drying the reaction product to obtain the polymer of fluorine-containing sulfonated poly(arylene ether)s.

In one embodiment of the present invention, the method further comprises a step (S05) after the step (S04) for:

dissolving the polymer of sulfonated poly(arylene ether)s in an organic solvent by phase changing, and forming a thin film by coating.

In one embodiment of the present Invention, the thin film is used as a proton exchange membrane and applied to a fuel cell system.

DETAILED DESCRIPTION OF THE PREFERRED EMBODIMENTS

Figure 1A:
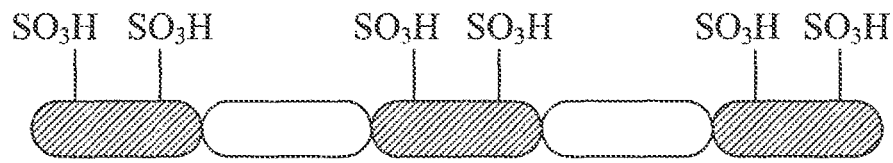
FIGS. 1A to 1D are schematic diagrams for showing the possible structures of the current sulfonated polymer used in a proton exchange membrane.
Figure 1B:
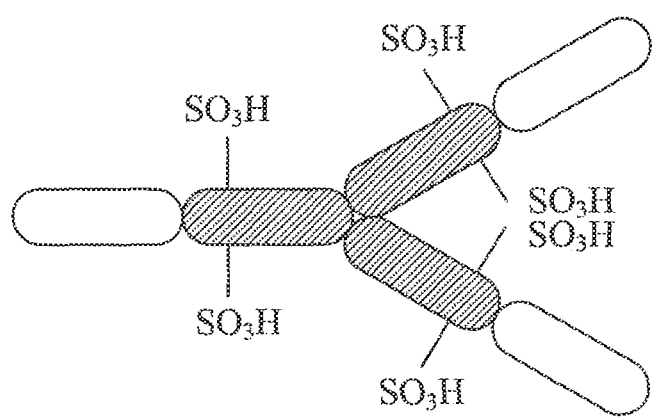
Figure 1C:
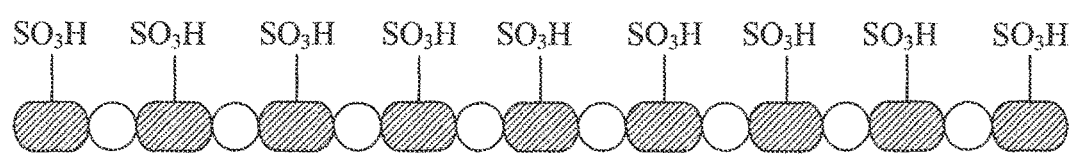
Figure 1D:
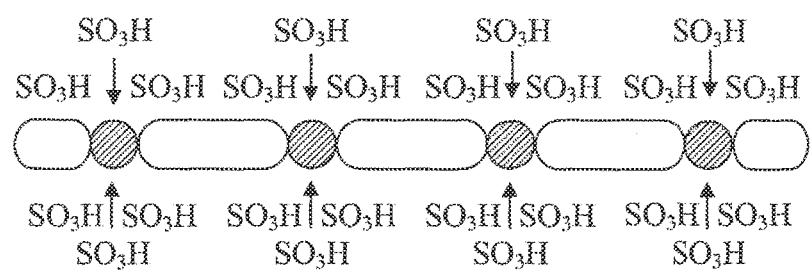

The structure and the technical means adopted by the present invention to achieve the above and other objects can be best understood by referring to the following detailed description of the preferred embodiments. Furthermore, if there is no specific description in the invention, singular terms such as "a", "one", and "the" include the plural number. For example, "a compound" or "at least one compound" may include a plurality of compounds, and the mixtures thereof. If there is no specific description in the invention, the "%" means "weight percentage (wt %)", and the numerical range (e.g. 10%-11% of A) contains the upper and lower limit (i.e. 10%≤A≤11%). If the lower limit is not defined in the range (e.g. less than, or below 0.2% of B), it means that the lower limit is 0 (i.e. 0%≤B≤0.2%). The proportion of "weight percent" of each component can be replaced by the proportion of "weight portion" thereof. The abovementioned terms are used to describe and understand the present invention, but the present invention is not limited thereto.

The present invention provides a polymer of fluorine-containing sulfonated poly(arylene ether)s and a method of manufacturing the same, the polymer is suitable for use as a functional polymer film, such as a proton exchange membrane or a solid electrolyte, and in particular for use as a proton exchange membrane in a fuel cell system.

In one embodiment of the present invention, the polymer of fluorine-containing sulfonated poly(arylene ether)s has the molecular formula given in the following formula (1):

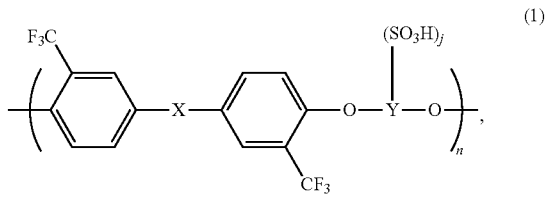

wherein X is

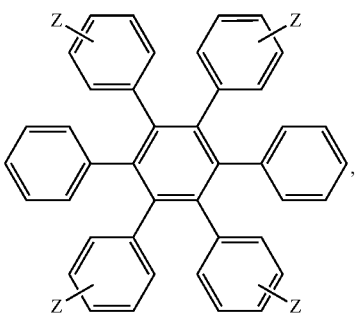

21
-continued
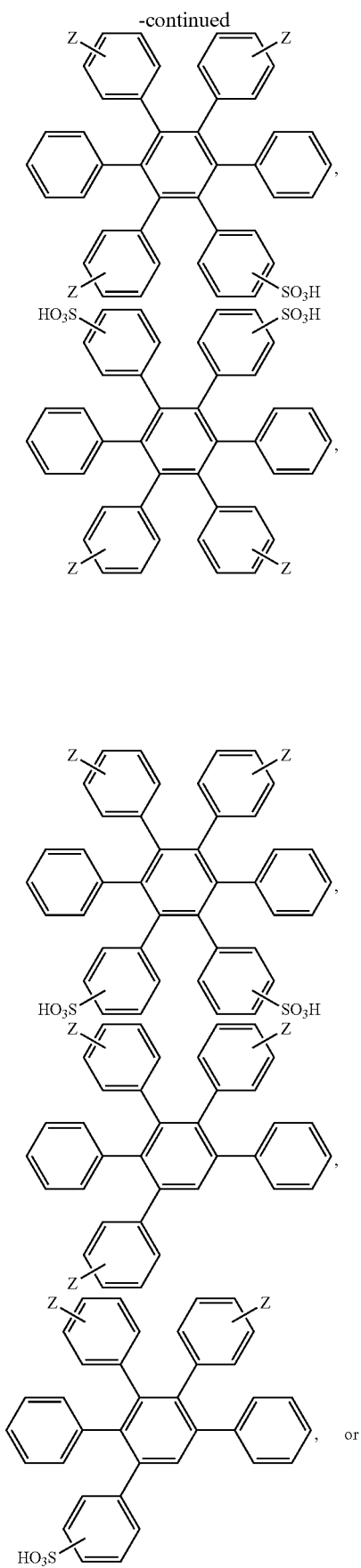
22
-continued
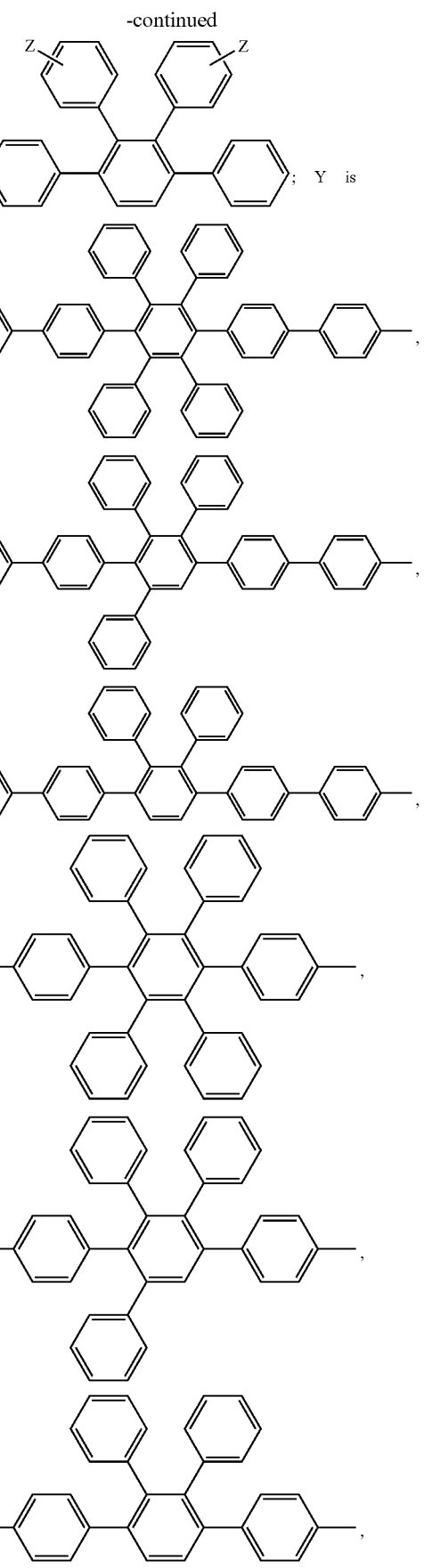
; Y is

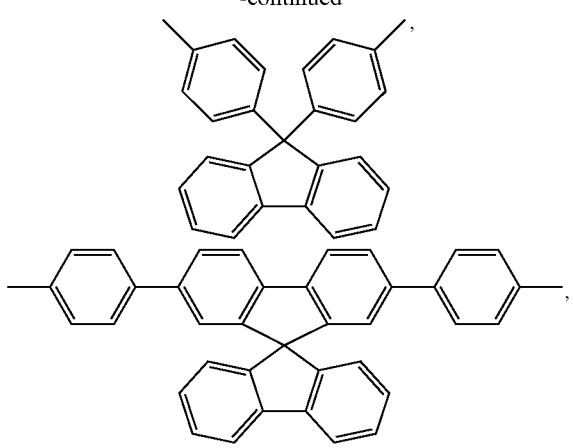
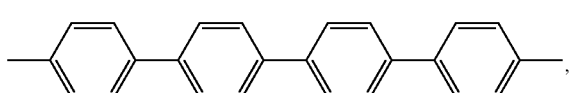
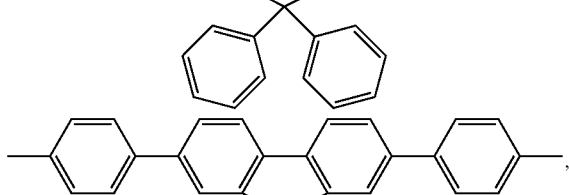
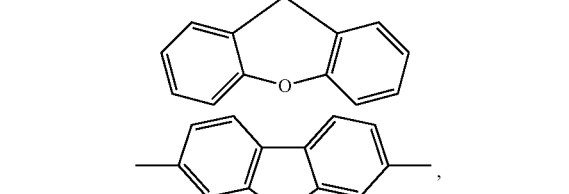
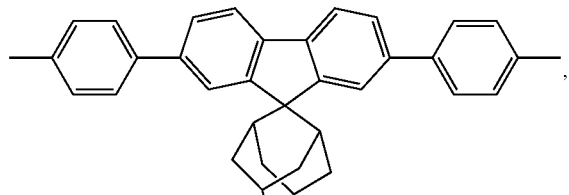
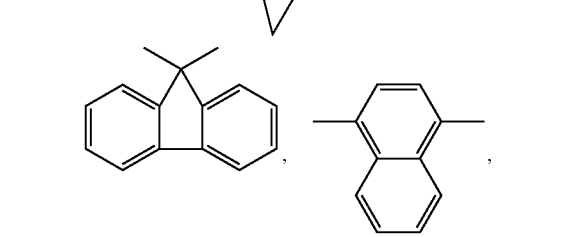
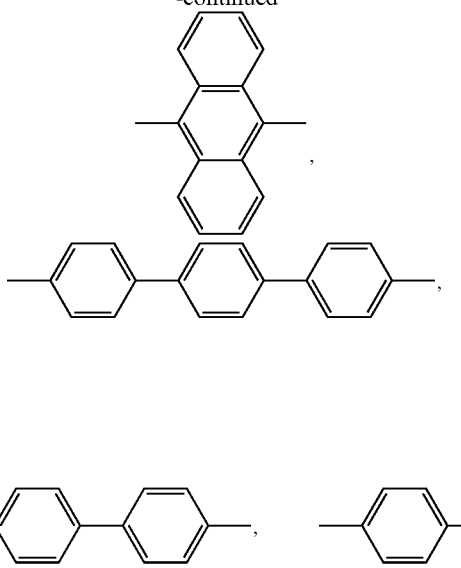
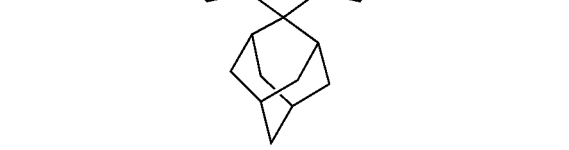
and wherein Z is independently selected from fluoro and trifluoromethyl group; n is an integer greater than or equal to 2; and j is an integer from 1 to 10. Preferably, the polymer of fluorine-containing sulfonated poly(arylene ether)s can be one of the following structural formulas (2)-(4).

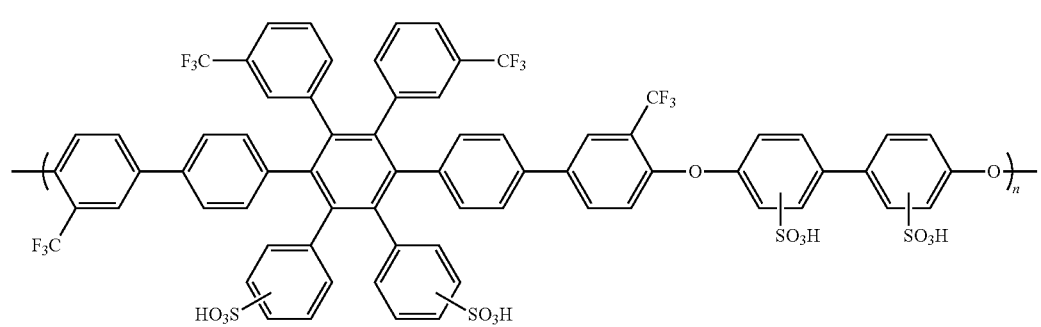

(2)

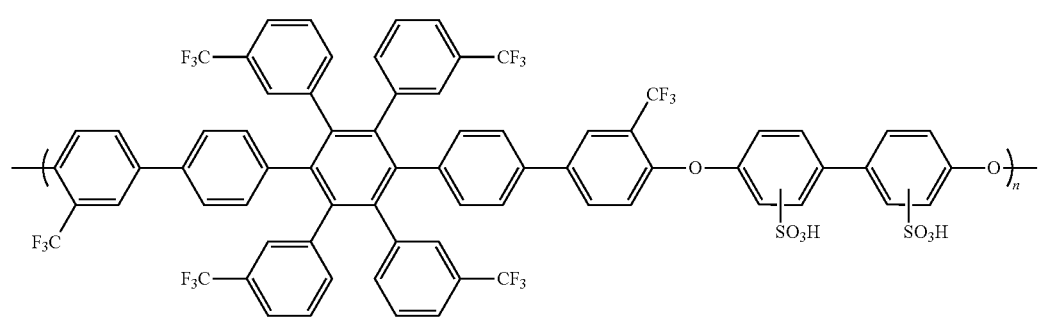

(3)

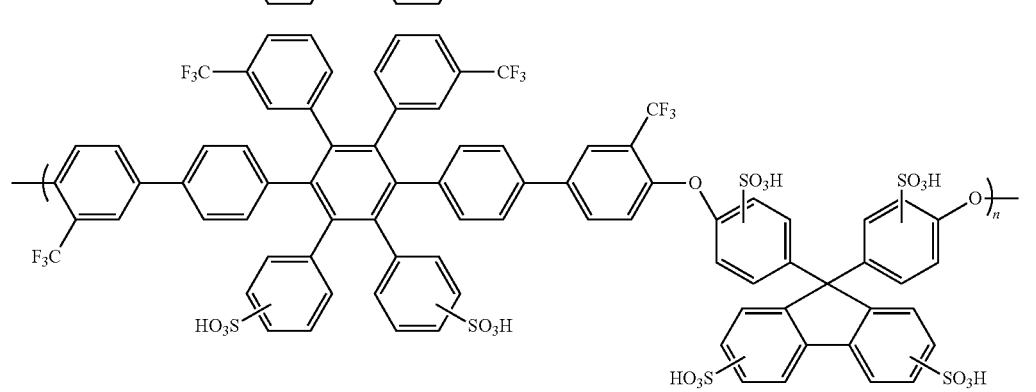

(4)

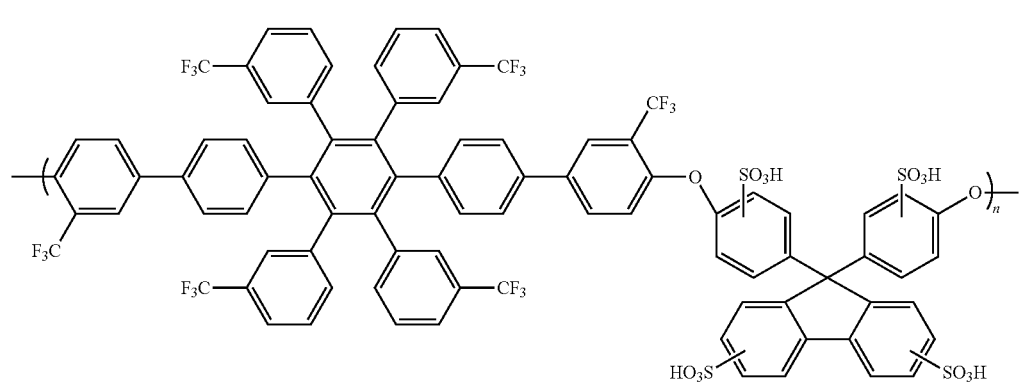

(5)

As shown in above formulas (2) to (5), the sulfonate groups (—SO₃H) are preferably located at the phenyl groups without Z, because Z is a fluorine-containing substituent, which is an electron-withdrawing group, so as to control the substituted positions of the sulfonate groups in the phenyl group, thereby adjusting the hydrophilicity or hydrophobicity of the polymer of fluorine-containing sulfonated poly (arylene ether)s to achieve excellent microphase separation. In addition, when there are two or more fluorine-containing substituents, each of them can be a different group, for example, each of one fluoro group (—F) and two trifluoromethyl groups (—CF₃) can be located at different phenyl rings in the polymer of fluorine-containing sulfonated poly (arylene ether)s, and they can be independently at the ortho-, meta-, or para position of the phenyl rings.

Another embodiment of the present invention provides a method of manufacturing a polymer of fluorine-containing sulfonated poly(arylene ether)s, comprising steps of (S01) providing a fluorine-containing monomer; (S02) providing a multi-phenyl monomer; (S03) processing a nucleophilic polycondensation between the fluorine-containing monomer and the multi-phenyl monomer to form a polymer of fluorine-containing poly(arylene ether)s; and (S04) carrying out a sulfonation modification of the polymer of fluorine-containing poly(arylene ether)s to form a polymer of fluorine-containing sulfonated poly(arylene ether)s. The principle and the implementation details of each step in this embodiment of the present invention will be described in detail hereinafter.

First, the method of manufacturing a polymer of fluorine-containing sulfonated poly(arylene ether)s according to one embodiment of the present invention is the step (S01): providing a fluorine-containing monomer. In this step, the fluorine-containing monomer has the structure given in the following formula (I):

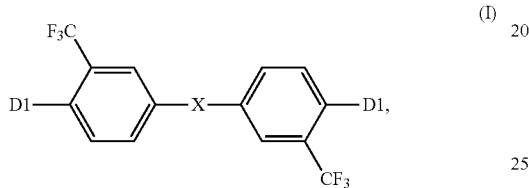

(I)

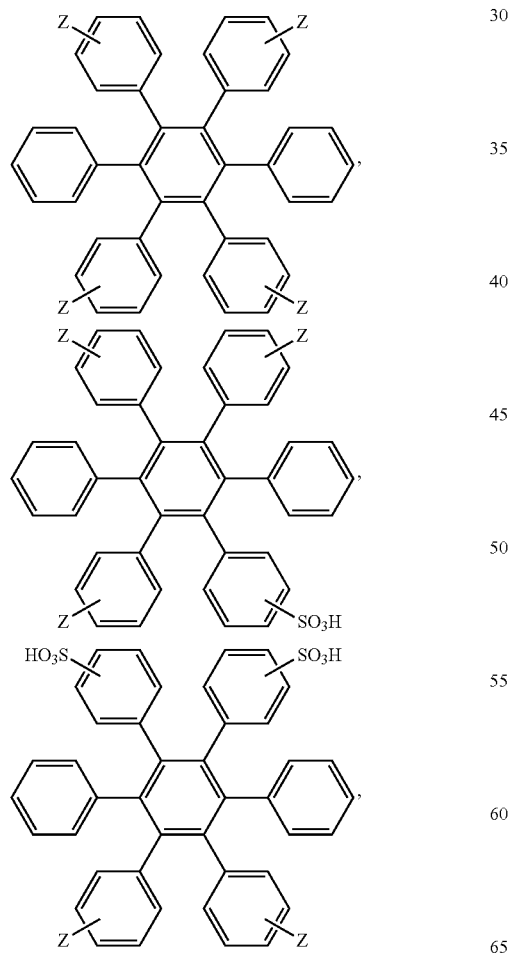

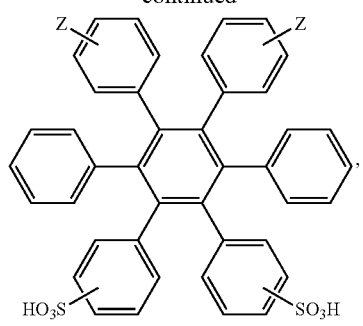

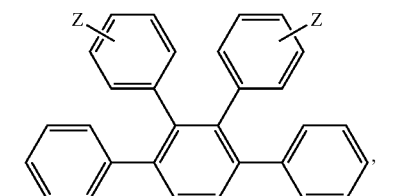

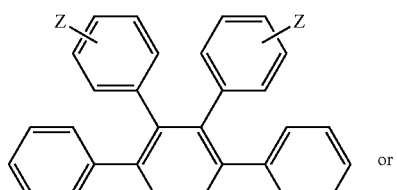

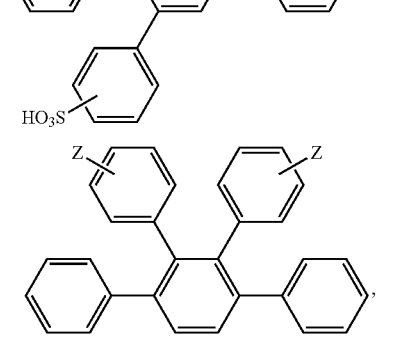

D1 is halogen or hydroxyl group; and Z is independently selected from fluoro- or trifluoromethyl group. The fluorine-containing monomer is preferably selected from

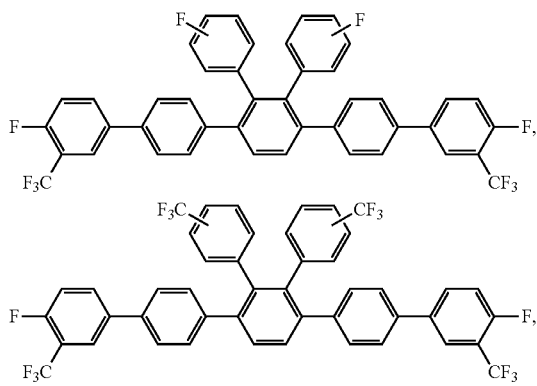

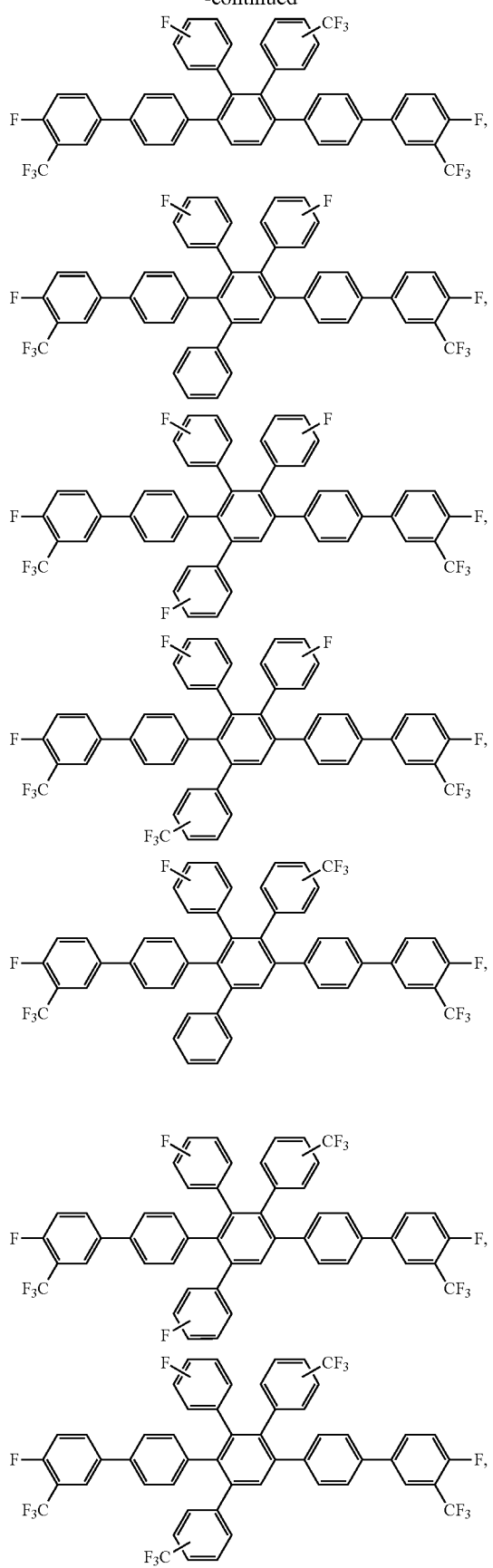
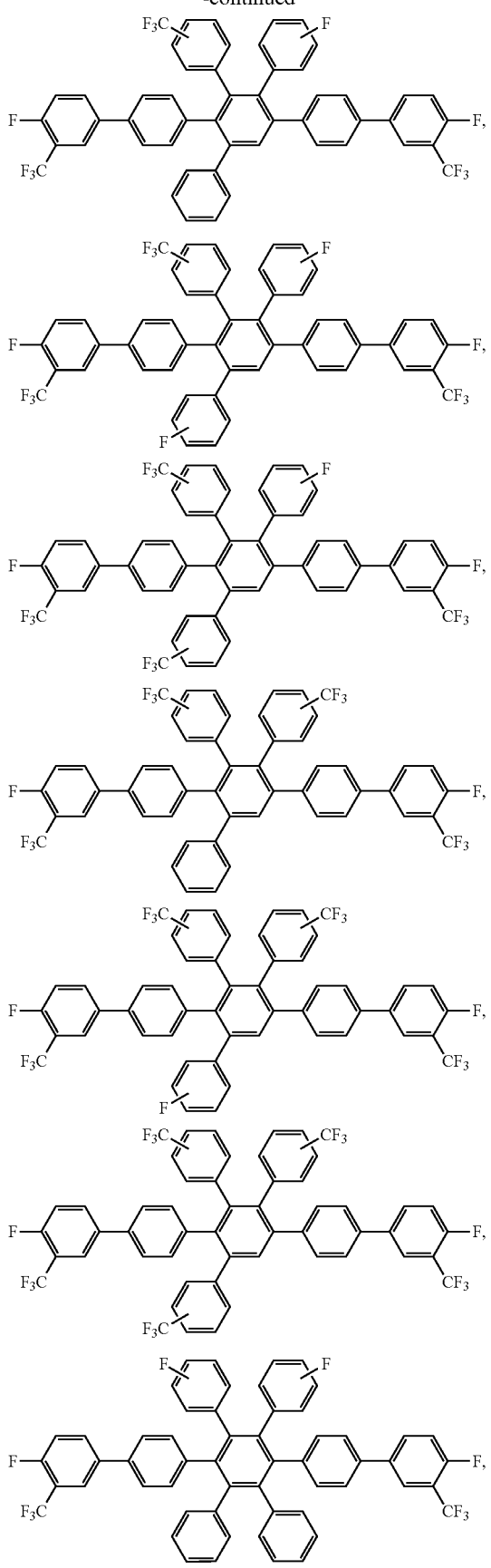

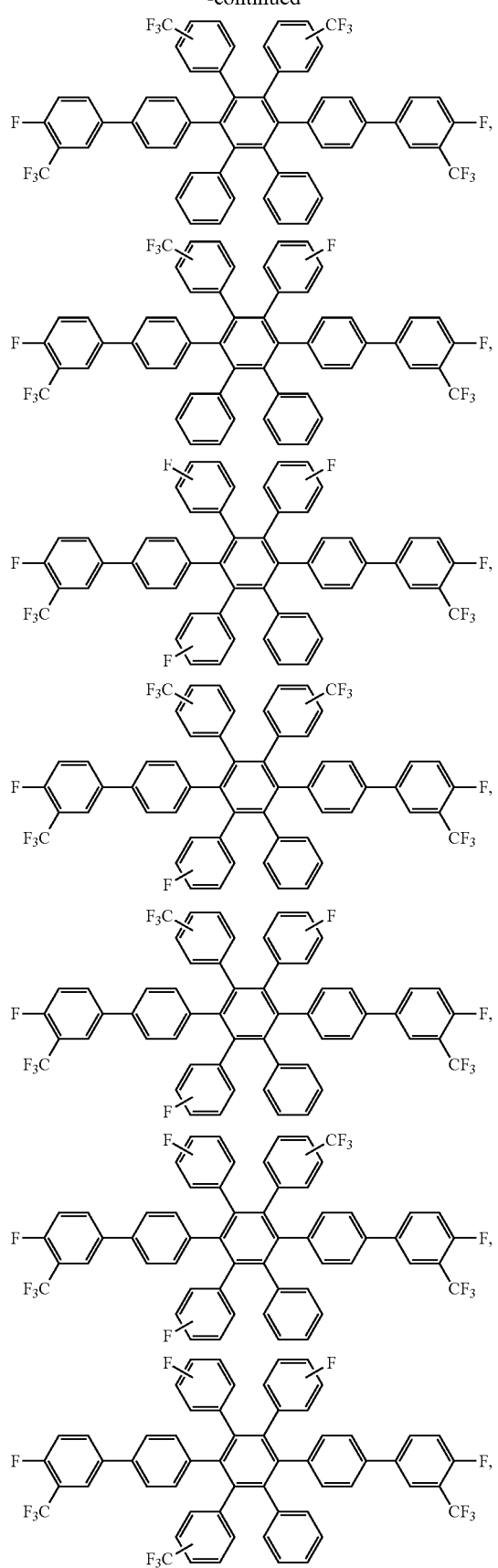
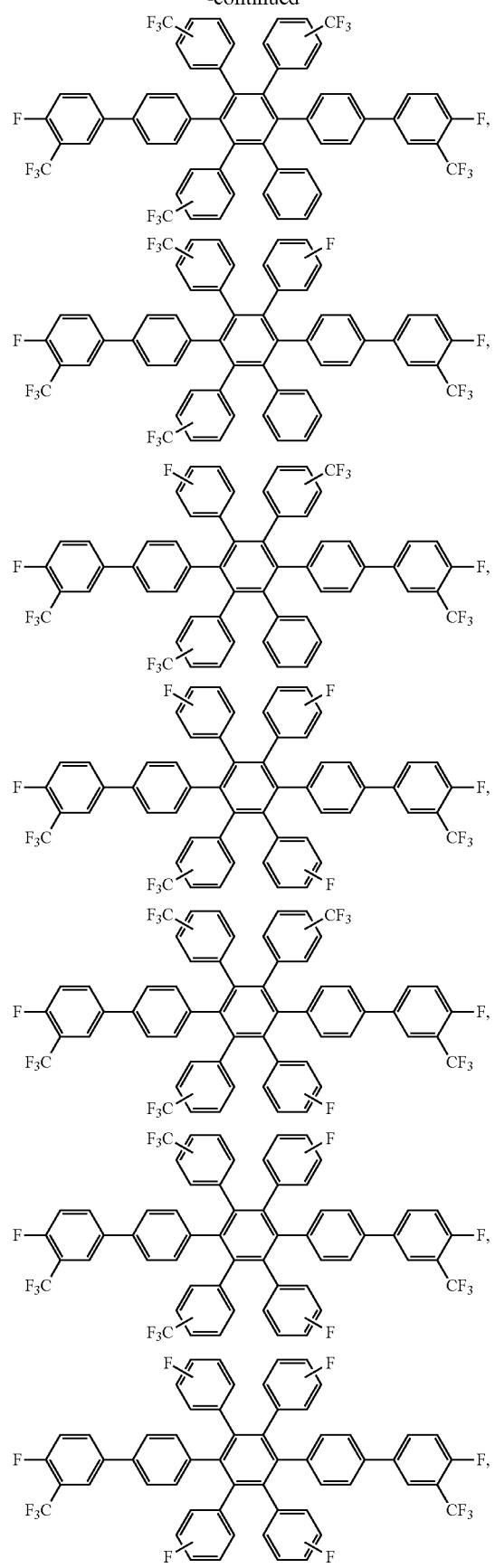

-continued

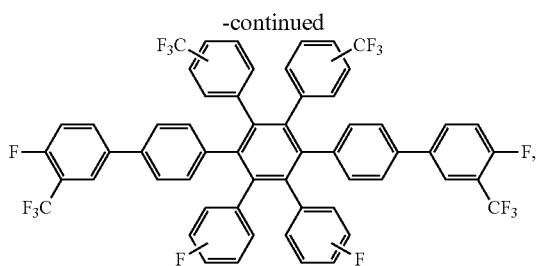

or

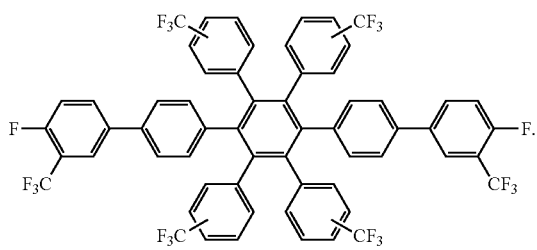

In addition, in this step, the preparation of the fluorine-containing monomer, comprising steps, for example: using 4-bromophenyl acetic acid

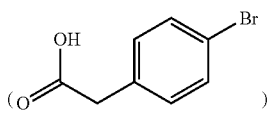 [SMILES: O=C(O)Cc1ccc(Br)cc1]

to react in the presence of magnesium oxide (MgO) at 200° C. and an intermediate 1 is obtained:

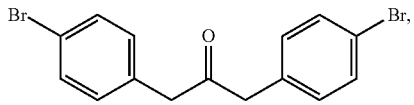 [SMILES: O=C(Cc1ccc(Br)cc1)Cc1ccc(Br)cc1]

wherein the bromo group (Br⁻) of 4-bromophenyl acetic acid can be replaced by a fluoro group (F⁻) or a chloro group (Cl⁻). Subsequently, a mixture of intermediate 1 and 1,2-Bis(3-trifluoromethyl)phenyl)ethane-1,2-dione

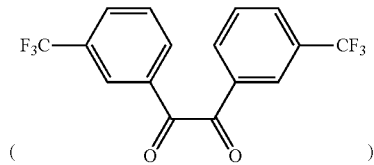 [SMILES: O=C(C(=O)c1cccc(C(F)(F)F)c1)c1cccc(C(F)(F)F)c1]

react in the presence of benzyltrimethyl ammonium hydroxide of the methanol solution (40 wt %) and triethylene glycol at a temperature of 115° C. to give the intermediate 2:

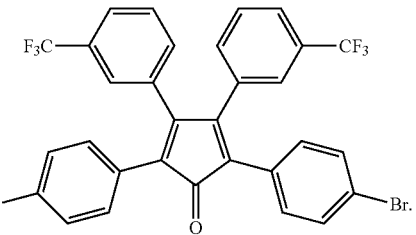

Subsequently, the intermediate 2 and diphenylacetylene

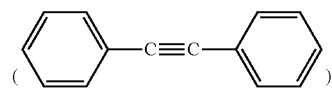 [SMILES: C(#Cc1ccccc1)c1ccccc1]

are mixed in diphenyl ether at a temperature of 220° C. and react to give a multi-phenyl dibromo compound as the intermediate 3:

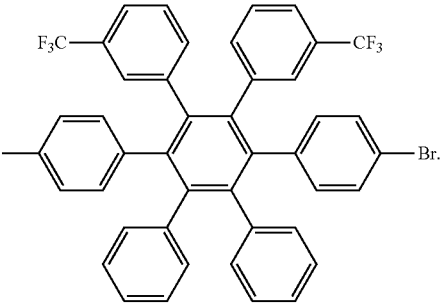

Then, the intermediate 3 and 4-fluoro-3-trifluoromethylphenylboronic acid

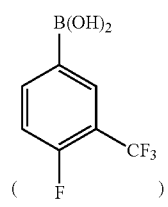

are mixed with toluene, THF (Tetrahydrofuran), and ethanol, and a catalyst (dichlorobis[di-tert-butyl (4-dimethylaminophenyl)phosphino]palladium(II)) (Pd(amphos)Cl₂) and 2M potassium carbonate (K₂CO₃) aqueous solution is added to react and form the fluorine-containing monomer 4:

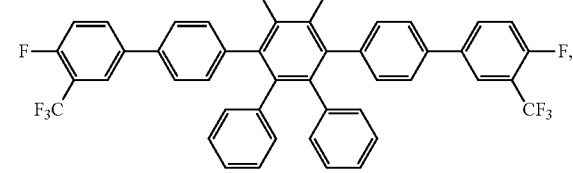

Next, the method of manufacturing a polymer of fluorine-containing sulfonated poly(arylene ether)s according to one embodiment of the present invention is the step (S02): providing a multi-phenyl monomer, having the structure given in the following formula (II):
D2-Y-D2     (II),
wherein Y is
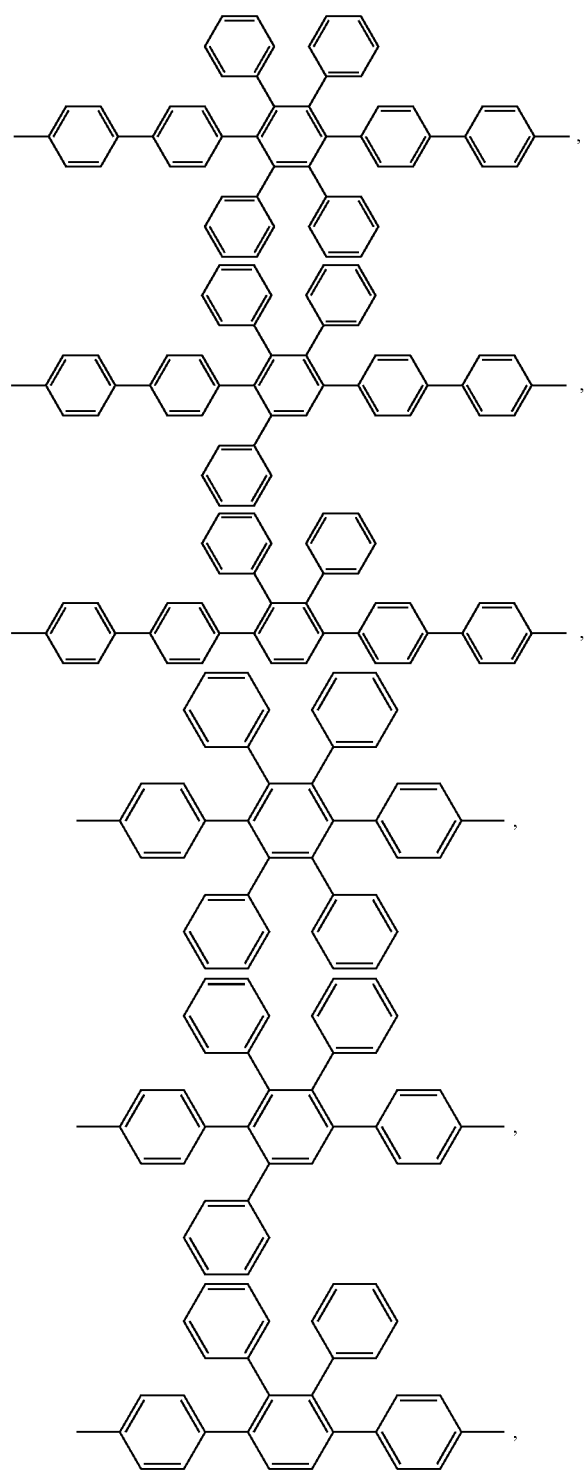
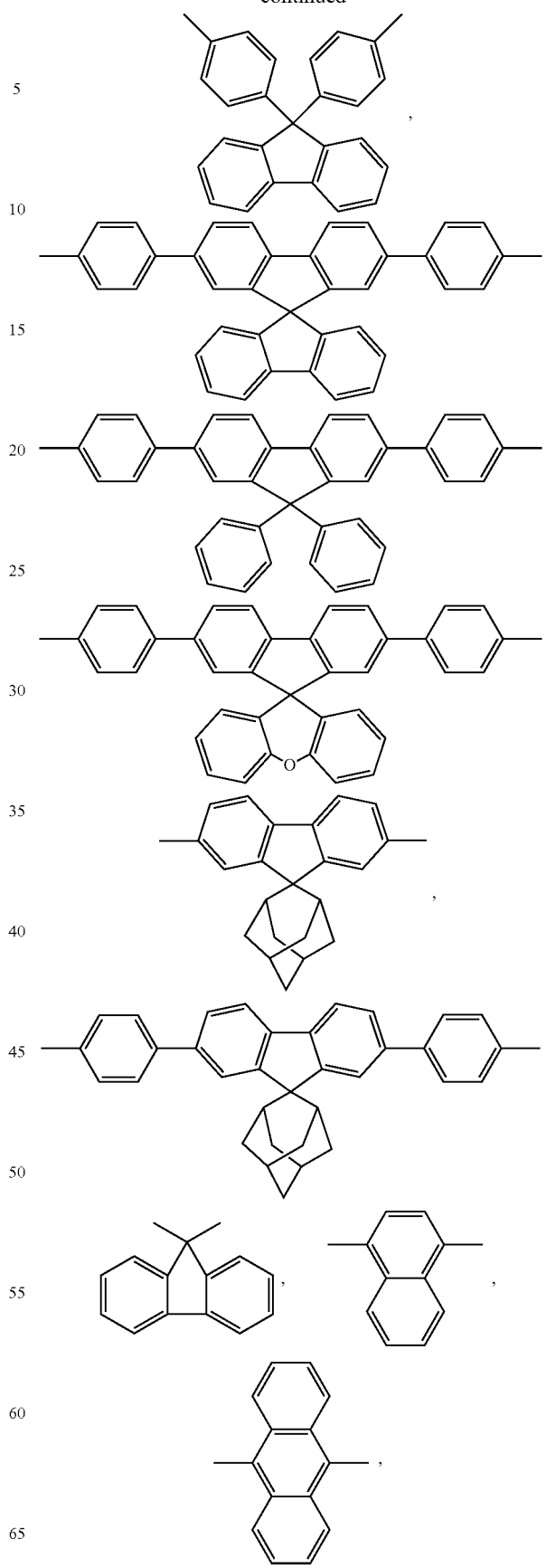

-continued

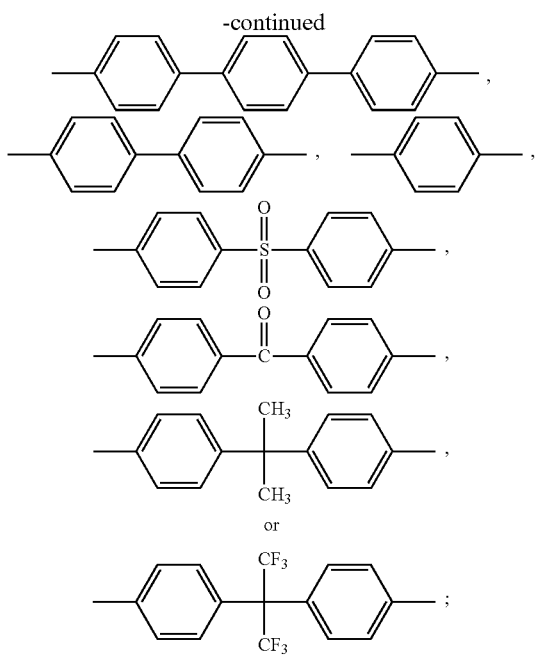

and D2 is a halogen or hydroxyl group. Preferably, D2 can be a halogen group, such as fluoro (—F) or chloro (—Cl), but it is not limited thereto. In this step, the multi-phenyl monomer may be directly commercially available. Alternatively, it can be prepared by the steps, for example: providing the intermediate 1

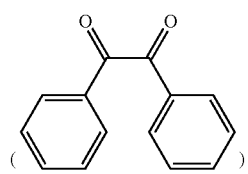 [SMILES: O=C(C(=O)c1ccccc1)c1ccccc1]

according to the step (S01). Subsequently, a mixture of intermediate 1 and benzil

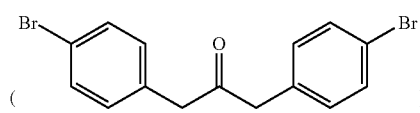

react in the presence of benzyltrimethyl ammonium hydroxide of the methanol solution (40 wt %) and triethylene glycol at a temperature of 115° C. to give the intermediate 5:

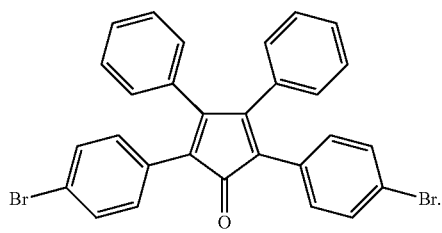 [SMILES: O=C1C(c2ccc(Br)cc2)=C(c2ccccc2)C(c2ccccc2)=C1c1ccc(Br)cc1]

Subsequently, the intermediate 5 and diphenylacetylene

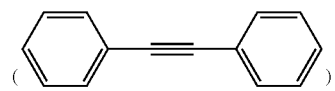

are mixed in diphenyl ether at a temperature of 220° C. and react to give a multi-phenyl dibromo compound as the intermediate 6:

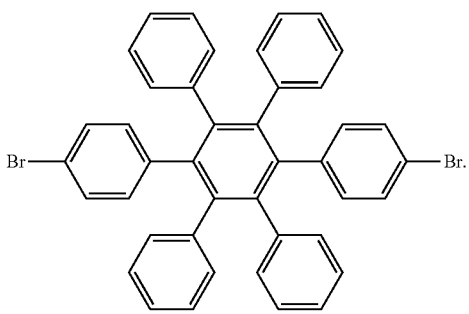 [SMILES: Brc1ccc(-c2c(-c3ccccc3)c(-c3ccccc3)c(-c3ccc(Br)cc3)c(-c3ccccc3)c2-c2ccccc2)cc1]

Then, the intermediate 6 and 4-methoxyphenylboronic acid

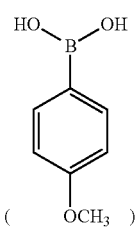

are mixed and stirred in toluene, and a catalyst (dichlorobis[di-tert-butyl (4-dimethylaminophenyl)phosphino]palladium(II)) (Pd(amphos)Cl$_2$) and 2M potassium carbonate (K$_2$CO$_3$) aqueous solution are added to react and form an intermediate 7:

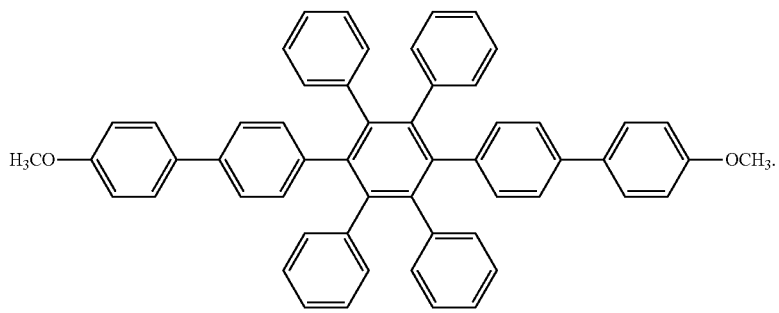 [SMILES: COc1ccc(-c2ccc(-c3c(-c4ccccc4)c(-c4ccccc4)c(-c4ccc(-c5ccc(OC)cc5)cc4)c(-c4ccccc4)c3-c3ccccc3)cc2)cc1]

Finally, the intermediate 7 and boron tribromide (BBr₃) are mixed in an appropriate amount of anhydrous methylene chloride (CH₂Cl₂) or anhydrous chloroform (CHCl₃) as a solvent, at −78° C., nitrogen atmosphere, to carry out the reaction and obtain the multi-phenyl monomer 8:

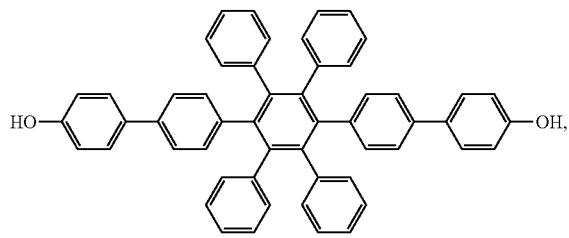 [SMILES: Oc1ccc(-c2ccc(-c3c(-c4ccccc4)c(-c4ccccc4)c(-c4ccc(-c5ccc(O)cc5)cc4)c(-c4ccccc4)c3-c3ccccc3)cc2)cc1]

wherein the above-mentioned boron tribromide (BBr₃) may be replaced by boron trifluoride (BF₃) or boron trichloride (BCl₃).

In addition, it should be noted that the steps (S01) and (S02) of the present invention may be interchanged or carried out simultaneously.

Next, the method of manufacturing a polymer of fluorine-containing sulfonated poly(arylene ether)s according to one embodiment of the present invention is the step (S03): processing a nucleophilic polycondensation between the fluorine-containing monomer and the multi-phenyl monomer to form a polymer of fluorine-containing poly(arylene ether)s. In this step, the fluorine-containing monomer 4, the multi-phenyl monomer 8, and potassium carbonate (K₂CO₃) are added to a distillation apparatus, then an appropriate amount of toluene and N,N-Dimethylacetamide (DMAc) are added. After the above monomers are dissolved in toluene, the toluene is removed at high temperature, and then the temperature is lowered to 140° C. in order to carry out the reaction to give the polymer of fluorine-containing poly(arylene ether)s 9:

Next, the method of manufacturing a polymer of fluorine-containing sulfonated poly(arylene ether)s according to one embodiment of the present invention is the step (S04): carrying out a sulfonation modification of the polymer of fluorine-containing poly(arylene ether)s to form a polymer of fluorine-containing sulfonated poly(arylene ether)s. In this step, the polymer of fluorine-containing poly(arylene ether)s 9 is dissolved in anhydrous dichloromethane to be a first solution; and a sulfonation reagent is added into the first solution under a nitrogen atmosphere, so as to be a second solution for a sulfonation reaction. The sulfonation reagent can be a mixture formed by lauric acid and chlorosulfonic acid. Subsequently, cyclohexane and ether are added into the second solution, so as to be a third solution. After this, a reaction product is separated from the third solution, and then the reaction product is collected and washed with deionized water. Finally, the reaction product is dried in vacuum to obtain the polymer of fluorine-containing sulfonated poly(arylene ether)s.

Furthermore, depending on the requirements, the above-mentioned polymer of fluorine-containing sulfonated poly (arylene ether)s according to the present Invention may be produced into a suitable form for standby, for example, after the step (S04), a step (S05) is further included for dissolving the polymer of fluorine-containing sulfonated poly(arylene ether)s in an organic solvent by phase changing, and coating the polymer on a surface then forming a thin film after drying, for example, the thin film can serve as a proton exchange membrane having the solid-state electrolyte and to be applied to a fuel cell system, but it is not limited thereto. It may also be used as other functional films, molecular separation membranes, or materials having proton transmission characteristics.

To make the polymer of fluorine-containing sulfonated poly(arylene ether)s and the method for manufacturing the polymer provided by the present invention more definite, and verify the dimensional stability thereof, please refer to

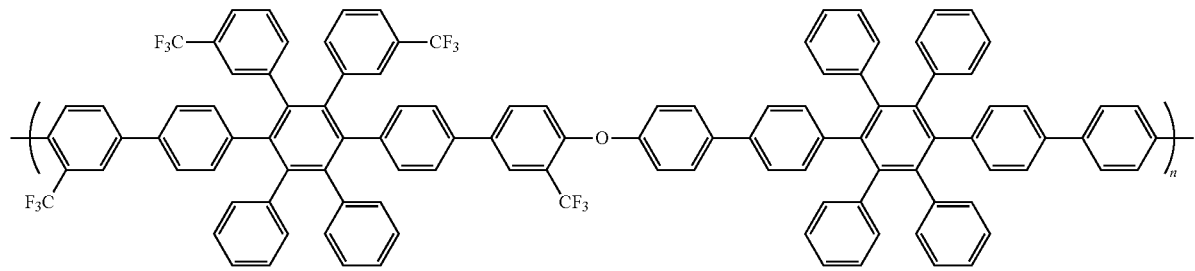

the experiment process and the results described in the following.

First, the abovementioned step (S03) is performed by using the fluorine-containing monomer and the multi-phenyl monomer as shown in Table 1 in order to prepare the polymer of fluorine-containing poly(arylene ether)s 12FP1, 12FP4, 18FP1, and 18FP4.

TABLE 1

| Polymer of fluorine-containing poly(arylene ether)s | fluorine-containing monomer | multi-phenyl monomer |
| --- | --- | --- |
| 12FP1 | 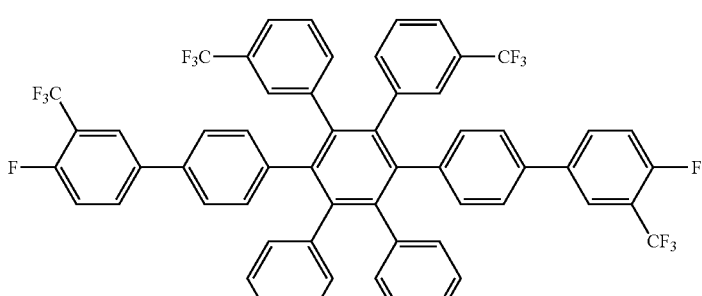 | 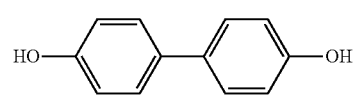 |
| 12FP4 | 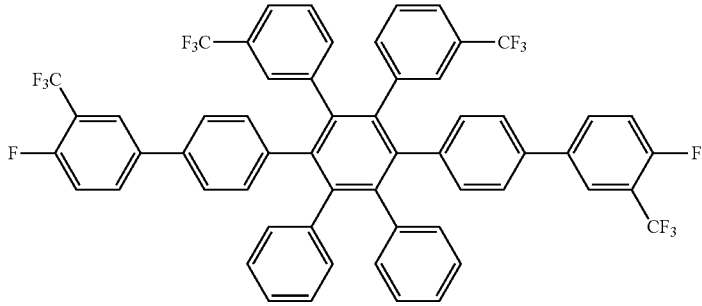 [SMILES: Fc1ccc(-c2ccc(-c3c(-c4ccccc4)c(-c4ccccc4)c(-c4ccc(-c5ccc(F)c(C(F)(F)F)c5)cc4)c(-c4cccc(C(F)(F)F)c4)c3-c3cccc(C(F)(F)F)c3)cc2)cc1C(F)(F)F] | 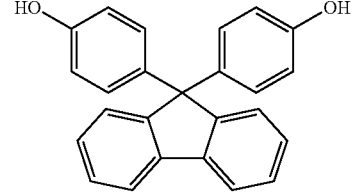 [SMILES: Oc1ccc(C2(c3ccc(O)cc3)c3ccccc3-c3ccccc32)cc1] |
| 18FP1 | 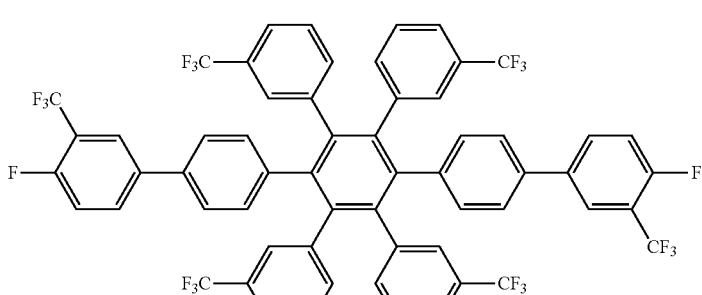 | 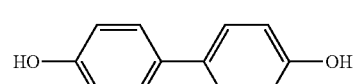 |
| 18FP4 | 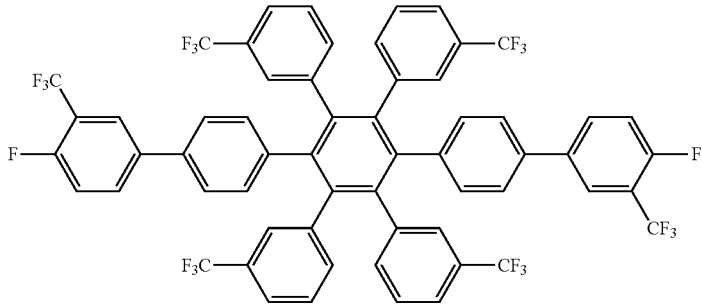 [SMILES: Fc1ccc(-c2ccc(-c3c(-c4cccc(C(F)(F)F)c4)c(-c4cccc(C(F)(F)F)c4)c(-c4ccc(-c5ccc(F)c(C(F)(F)F)c5)cc4)c(-c4cccc(C(F)(F)F)c4)c3-c3cccc(C(F)(F)F)c3)cc2)cc1C(F)(F)F] | 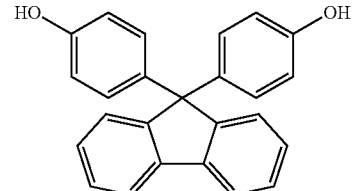 |

Refer to Table 2, which shows number average molecular weight (Mn), weight average molecular weight (Mw), and polydispersity (PDI) of the polymer of fluorine-containing poly(arylene ether)s (12FP1, 12FP4, 18FP1, 18FP4) before sulfonation.

TABLE 2

| Polymer of fluorine-containing poly(arylene ether)s | Mn | Mw | PDI |
| --- | --- | --- | --- |
| 12FP1 | 156,000 | 228,000 | 1.46 |
| 12FP4 | 116,000 | 157,000 | 1.35 |
| 18FP1 | 99,400 | 163,000 | 1.64 |
| 18FP4 | 145,000 | 194,000 | 1.34 |

Next, the polymer of fluorine-containing poly(arylene ether)s is dissolved in anhydrous dichloromethane, and a mixture of lauric acid and chlorosulfonic acid was added therein under a nitrogen atmosphere for sulfonation reaction. Subsequently, cyclohexane and ether are added for separating out the product, and then the product was filtered, collected and washed by deionized water. Finally, the product was dried in vacuum to obtain the polymer of fluorine-containing sulfonated poly(arylene ether)s S12FP1, S12FP4, S18FP1, and S18FP4, which has the structure given in the formula (2)-(5), respectively. By adding different doses of the sulfonation reagent, there were provided eight polymers having different sulfonation degrees, as shown in Table 3, the IEC is 0.20 mmol/g-2.69 mmol/g, and the sulfonation degree is 15%-91%.

TABLE 3

| Polymer of sulfonated poly(arylene ether)s | Sulfonation reagent (Lauric acid + Chlorosulfonic acid) (c.c.) | IEC (mmol/g) | Sulfonation degree (%) |
| --- | --- | --- | --- |
| S12FP1-2.02 | 6 | 2.02 | 75 |
| S12FP1-2.47 | 10 | 2.47 | 91 |
| S12FP4-2.67 | 6 | 2.67 | 80 |
| S12FP4-2.69 | 10 | 2.69 | 81 |
| S18FP1-0.20 | 6 | 0.20 | 15 |
| S18FP1-0.28 | 10 | 0.28 | 21 |
| S18FP4-1.20 | 6 | 1.20 | 54 |
| S18FP4-1.90 | 10 | 1.90 | 85 |

The abovementioned polymers of fluorine-containing sulfonated poly(arylene ether)s all have good thermal stability with two pyrolysis stages. The first stage results from the pyrolysis of the sulfonate groups, and Td5% is around 248° C.-348° C. The pyrolysis degree raises with the sulfonation degree, thus the sulfonation degree can be indirectly proofed. The second stage results from the pyrolysis of the main chains, the pyrolysis temperature thereof corresponds with the pyrolysis temperature of the polymer before sulfonation, which shows that the polymers of fluorine-containing sulfonated poly(arylene ether)s have high thermal stability. The water absorption of the thin film formed by the polymer of fluorine-containing sulfonated poly(arylene ether)s is about 0-170%, and the dimensional stability of the length and the thickness can be maintained respectively within 35% and 39%. Therefore, the proton exchange membrane has good dimensional stability. In addition, the proton conductivity of the membrane can reached around 0.23 S/cm.

Compared with conventional techniques, the polymer of fluorine-containing sulfonated poly(arylene ether)s according to the present invention has a first portion with electron-withdrawing groups from a fluorine-containing monomer, and a second portion with multi-phenyl groups from a multi-phenyl monomer. This main structure can be obtained by processing a nucleophilic polycondensation and sulfonation reaction. Because the fluorine-containing substituents (—F or —CF$_3$) are introduced into the monomers, the phenyl groups will be inactivated to prevent the phenyl groups having the trifluoromethyl or fluoro groups from being attacked by a sulfonation reagent and being connected with the sulfonation reagent during sulfonation reaction so that the positions of the sulfonate groups can be efficiently controlled to locally and densely distribute on the phenyl rings for providing the hydrophilicity. Therefore, the polymer of fluorine-containing sulfonated poly(arylene ether)s not only has a good microphase separation, but also makes the sulfonate groups being gathered efficiently, so as to construct a better proton passages for transmitting protons. Meanwhile, the electron-withdrawing fluorine-containing groups can protect the phenyl groups and provide hydrophobicity, so that the produced membrane of the polymer of fluorine-containing sulfonated poly(arylene ether)s has water absorption ranged from 0% to 170%, and the dimensional stability of the length and the thickness can be maintained respectively within 35% and 39%. Compared with the current sulfonated polymers, the polymer of fluorine-containing sulfonated poly(arylene ether)s of the present invention ensure a good degree of polymerization, thermal stability, mechanical properties and conductivity, and further has better dimensional stability.

The present invention has been described with preferred embodiments thereof and it is understood that many changes and modifications to the described embodiments can be carried out without departing from the scope and the spirit of the invention that is intended to be limited only by the appended claims.

What is claimed is:

1. A method of manufacturing a polymer of fluorine-containing sulfonated poly(arylene ether)s, comprising steps of:
   (S01) providing a fluorine-containing monomer having a structure given in the following formula (I):

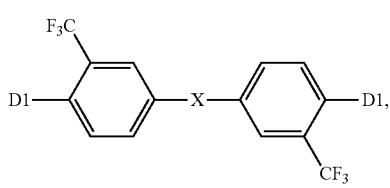

wherein X is

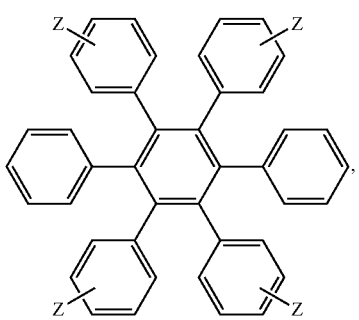

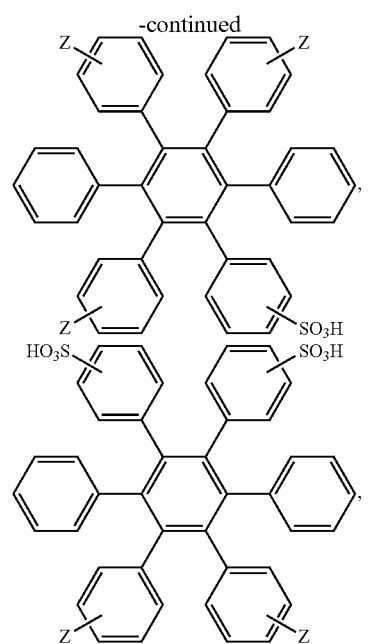
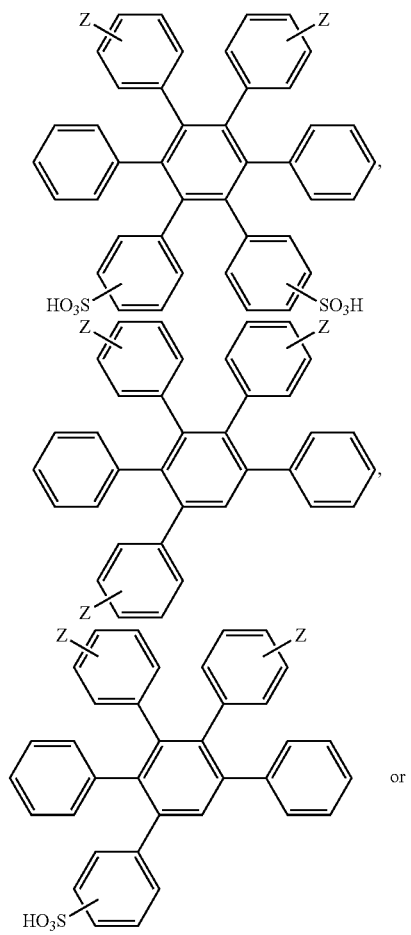
or
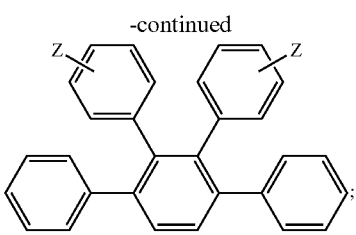
D1 is halogen or hydroxyl group; and Z is independently selected from fluoro- or trifluoromethyl group;
(S02) providing a multi-phenyl monomer having a structure given in the following formula (II):
$$D2-Y-D2 \quad (II)$$
wherein Y is
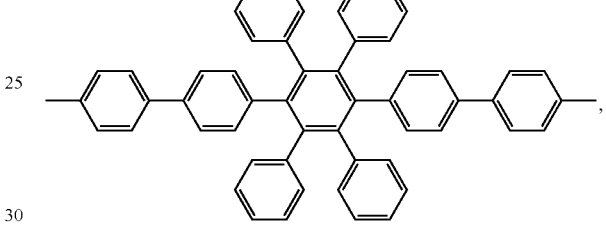
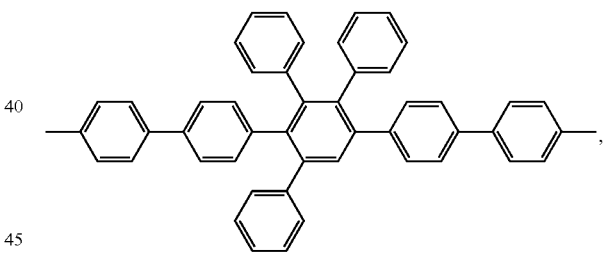
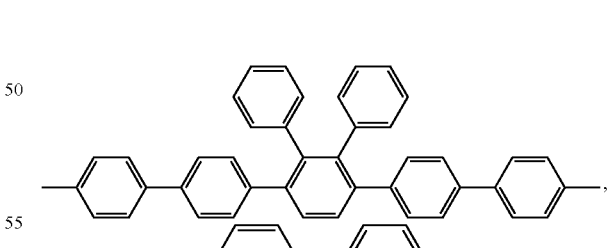
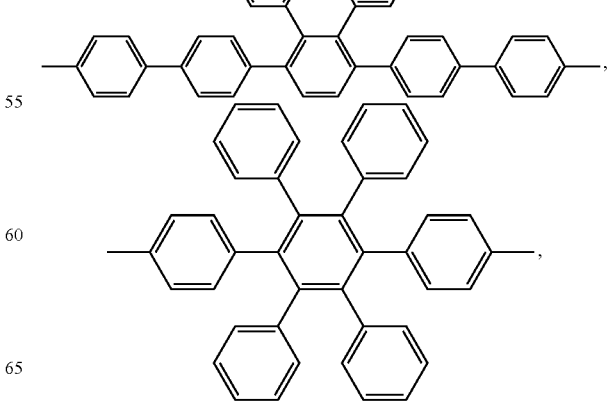

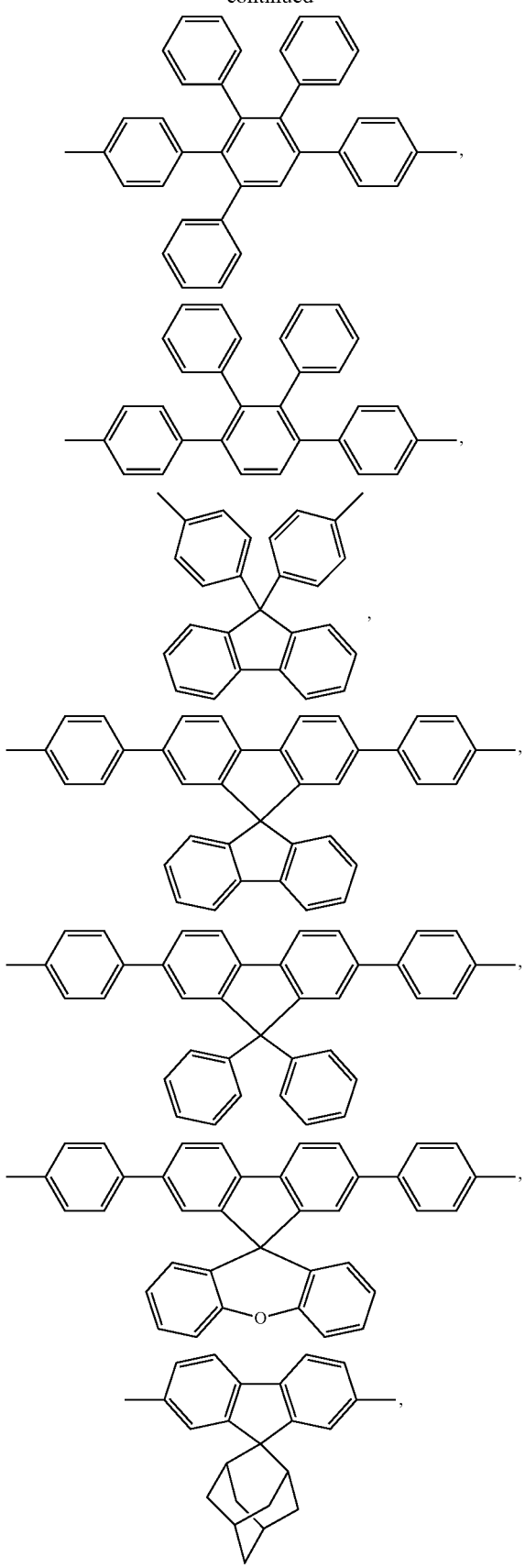
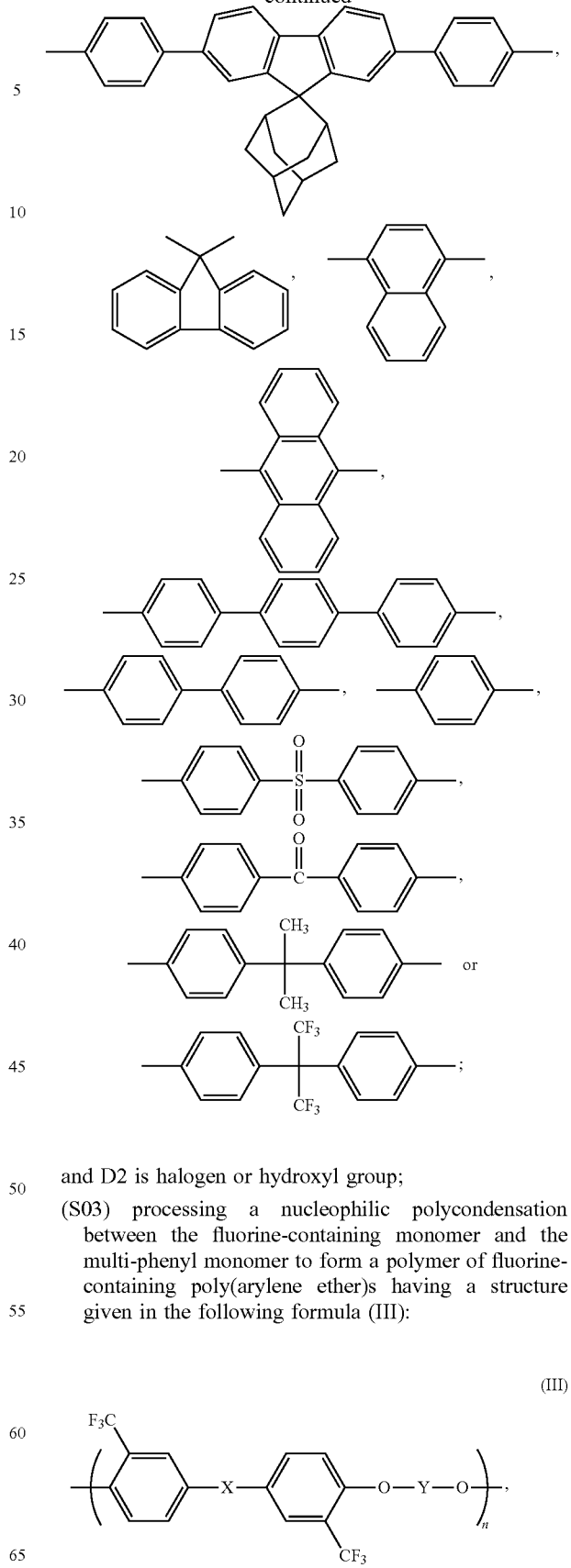
and D2 is halogen or hydroxyl group;
(S03) processing a nucleophilic polycondensation between the fluorine-containing monomer and the multi-phenyl monomer to form a polymer of fluorine-containing poly(arylene ether)s having a structure given in the following formula (III):
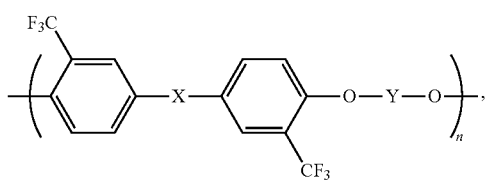

wherein n is an integer greater than or equal to 2; and D2 is the hydroxyl group if D1 is the halogen group, or D2 is the halogen group if D1 is the hydroxyl group; and (S04) carrying out a sulfonation modification of the polymer of fluorine-containing poly(arylene ether)s to form a polymer of fluorine-containing sulfonated poly(arylene ether)s having a molecular formula given in the following formula (1):

$$\left(\begin{array}{c}\phantom{X}\\ \phantom{X}\end{array}\right) \quad (1)$$

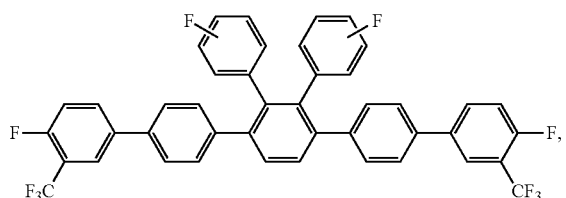

wherein j is an integer from 1 to 10.

2. The method according to claim 1, wherein the fluorine-containing monomer in step (S01) is selected from

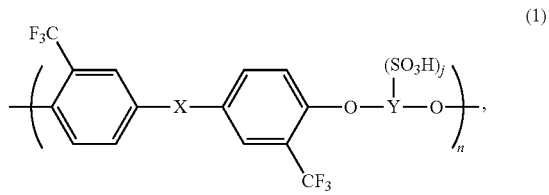

or

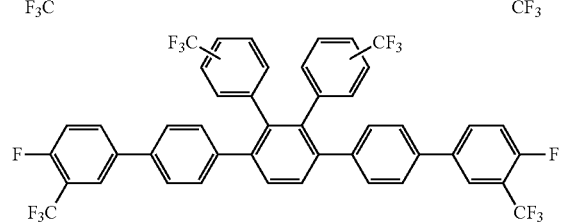

3. The method according to claim 1, wherein the fluorine-containing monomer in the step (S01) is selected from

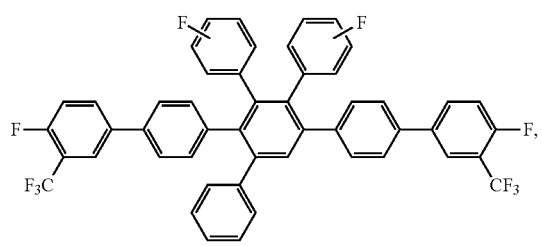

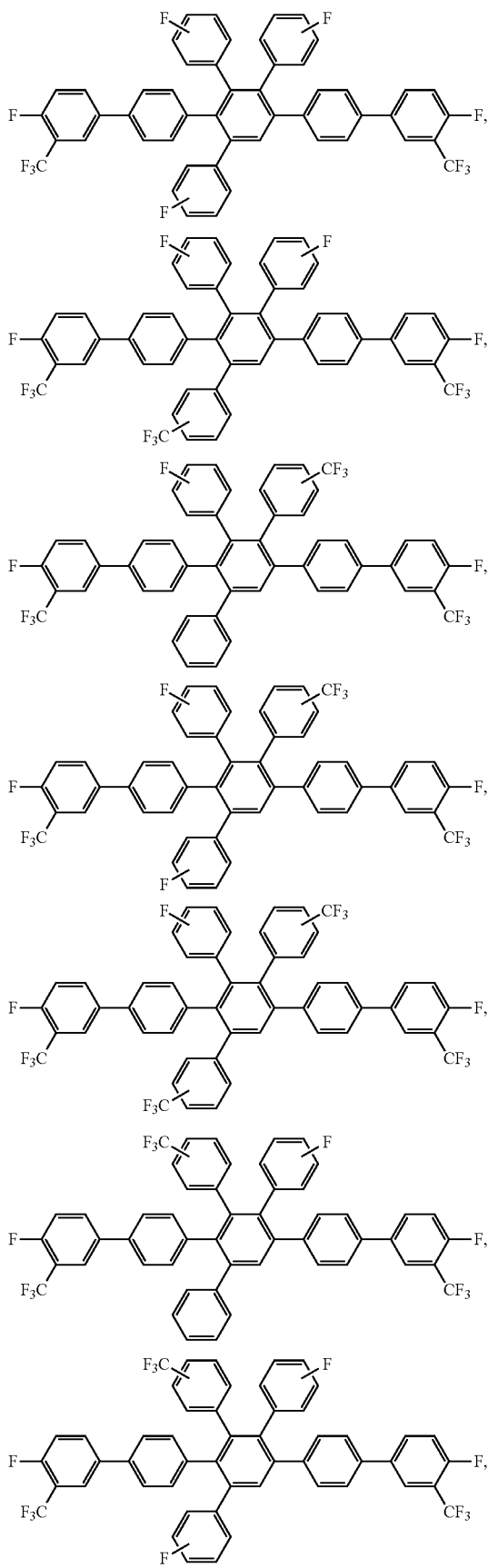

-continued
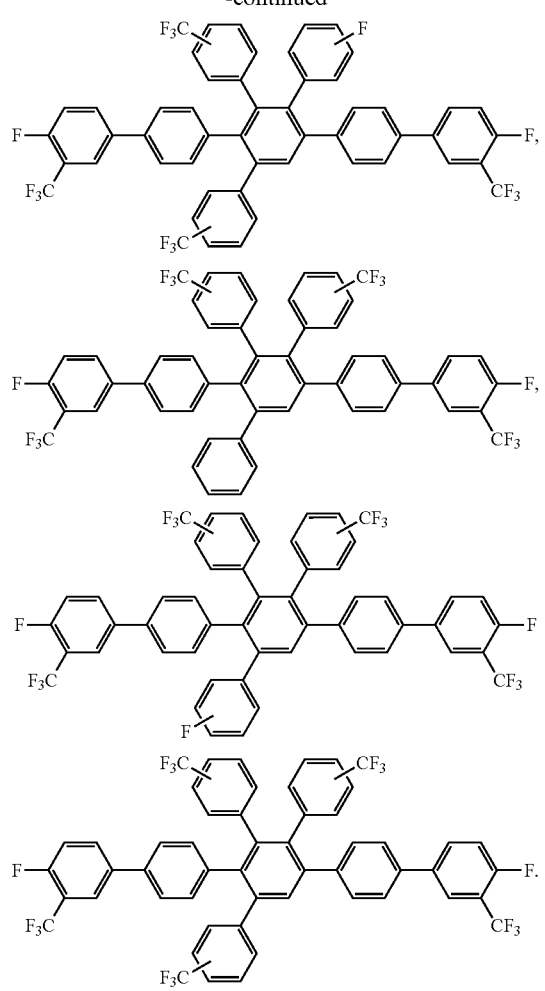
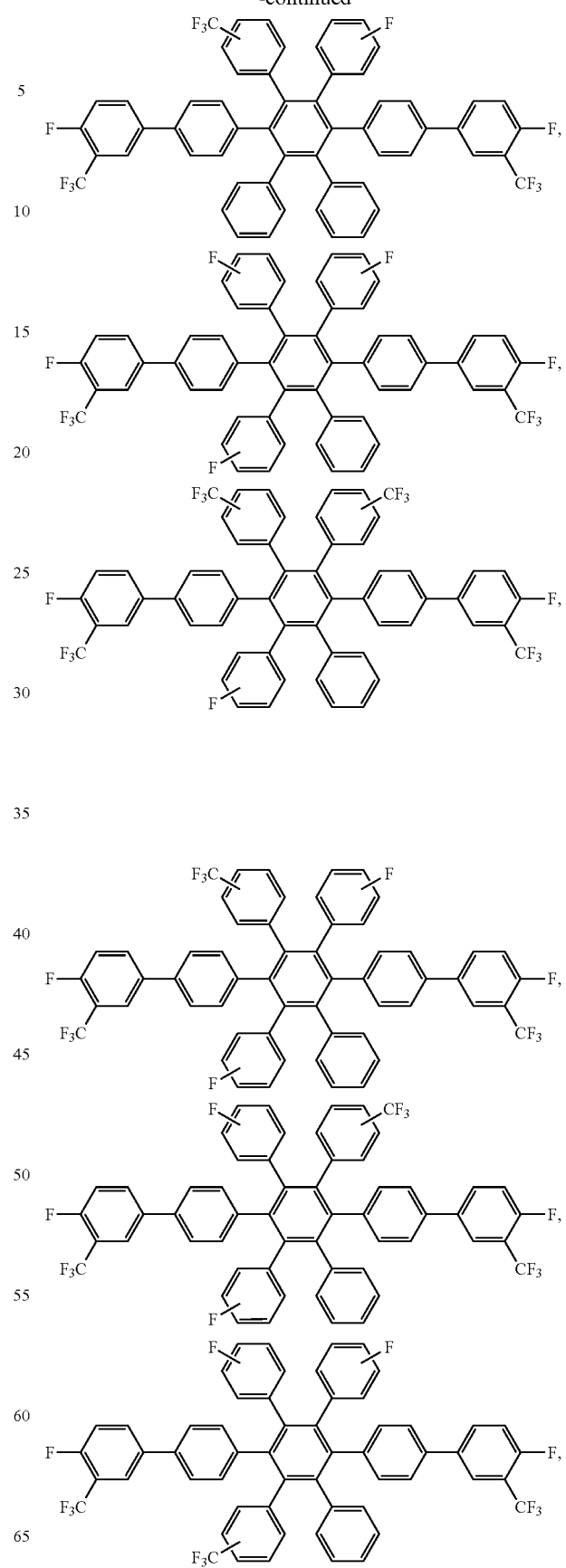
4. The method according to claim 1, wherein the fluorine-contaning monomer in the step (S01) is selected from
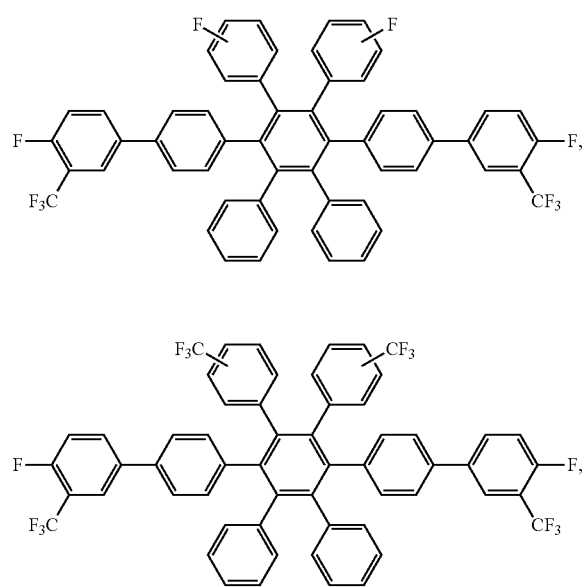

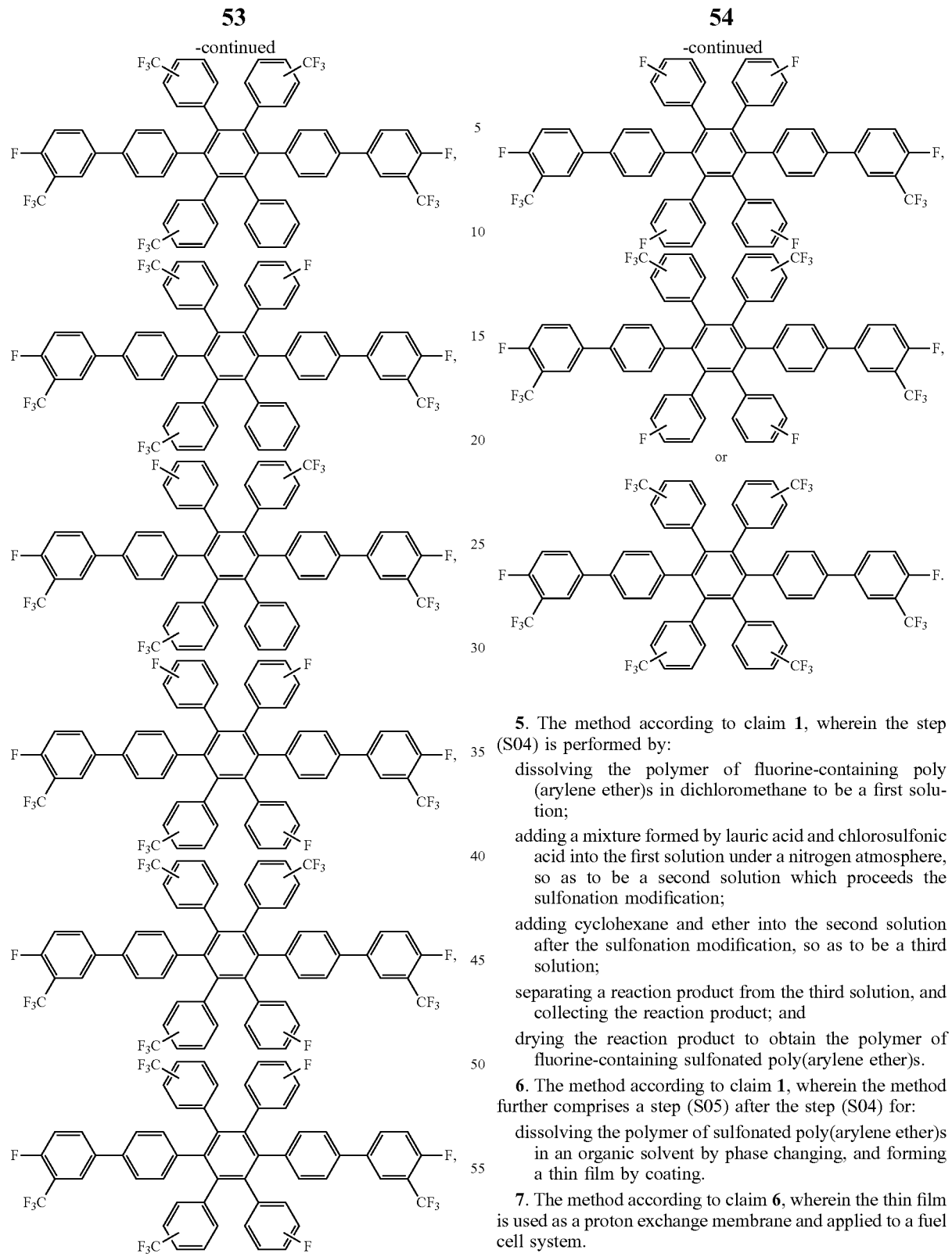

5. The method according to claim 1, wherein the step (S04) is performed by:
dissolving the polymer of fluorine-containing poly(arylene ether)s in dichloromethane to be a first solution;
adding a mixture formed by lauric acid and chlorosulfonic acid into the first solution under a nitrogen atmosphere, so as to be a second solution which proceeds the sulfonation modification;
adding cyclohexane and ether into the second solution after the sulfonation modification, so as to be a third solution;
separating a reaction product from the third solution, and collecting the reaction product; and
drying the reaction product to obtain the polymer of fluorine-containing sulfonated poly(arylene ether)s.

6. The method according to claim 1, wherein the method further comprises a step (S05) after the step (S04) for:
dissolving the polymer of sulfonated poly(arylene ether)s in an organic solvent by phase changing, and forming a thin film by coating.

7. The method according to claim 6, wherein the thin film is used as a proton exchange membrane and applied to a fuel cell system.

\* \* \* \* \*